US009726078B2

(12) United States Patent
Shen

(10) Patent No.: US 9,726,078 B2
(45) Date of Patent: Aug. 8, 2017

(54) APPARATUS WITH VARIABLE COMPRESSION RATIO AND VARIABLE EXPANSION RATIO

(71) Applicant: Dazi Shen, Shanghai (CN)

(72) Inventor: Dazi Shen, Shanghai (CN)

( * ) Notice: Subject to any disclaimer, the term of this patent is extended or adjusted under 35 U.S.C. 154(b) by 103 days.

(21) Appl. No.: 14/938,836

(22) Filed: Nov. 11, 2015

(65) Prior Publication Data
US 2016/0061105 A1    Mar. 3, 2016

Related U.S. Application Data

(63) Continuation of application No. PCT/CN2014/000072, filed on Jan. 20, 2014.

(30) Foreign Application Priority Data

May 16, 2013  (CN) .......................... 2013 1 0182783

(51) Int. Cl.
*F02D 15/02* (2006.01)
*F02B 75/04* (2006.01)

(52) U.S. Cl.
CPC ............ *F02B 75/048* (2013.01); *F02D 15/02* (2013.01); *Y02T 10/12* (2013.01)

(58) Field of Classification Search
CPC ......... F02B 75/048; F02D 15/02; Y02T 10/12
USPC .................................. 123/48 B, 78 F, 78 E
See application file for complete search history.

(56) References Cited

U.S. PATENT DOCUMENTS

| 460,642 | A | 10/1891 | Kitson |
|---|---|---|---|
| 4,044,629 | A | 8/1977 | Clarke |
| 5,927,236 | A | 7/1999 | Gonzalez |
| 6,349,684 | B1 | 2/2002 | De Gooijer |
| 6,371,062 | B1 | 4/2002 | Rao et al. |
| 2008/0022977 | A1 | 1/2008 | Marchisseau |
| 2009/0241910 | A1* | 10/2009 | Shin ........................ F02D 15/02 123/48 B |
| 2012/0059543 | A1* | 3/2012 | Nakazono .............. B60K 6/445 701/22 |

(Continued)

FOREIGN PATENT DOCUMENTS

| CN | 101333964 A | 12/2008 |
|---|---|---|
| CN | 102889142 A | 1/2013 |
| CN | 103047002 A | 4/2013 |

*Primary Examiner* — Marguerite McMahon
(74) *Attorney, Agent, or Firm* — Kening Li; Miller Canfield

(57) ABSTRACT

Apparatus with variable compression ratio and variable expansion ratio for an internal combustion engine, mounted on the engine crankshaft and the assembly of the piston-connecting rod, comprising an actuating motor, a worm, a worm gear, a sun gear, a first transmission shaft, a plurality of the transmission shafts, a first eccentric sleeve, a plurality of eccentric sleeve, a front gear of the first eccentric sleeve, a plurality of the front gear of the eccentric sleeve, a plurality of the rear gear of the eccentric sleeve, a planetary gear, the rear gear of the first transmission shaft, a plurality of the front gear of the transmission shaft, and a plurality of the rear gear of the transmission shaft. An angle α between the axis of the first transmission shaft and the axis of the crankshaft is not zero, the other axes of the transmission shafts with the axis of the crankshaft coincide, or parallel but do not coincide, or form a non zero angle.

9 Claims, 16 Drawing Sheets

A-A

(56) References Cited

U.S. PATENT DOCUMENTS

2012/0125297 A1     5/2012   Lee et al.
2013/0327291 A1*   12/2013   Pett, Jr. .................. F02B 19/00
                                                                                        123/253

* cited by examiner

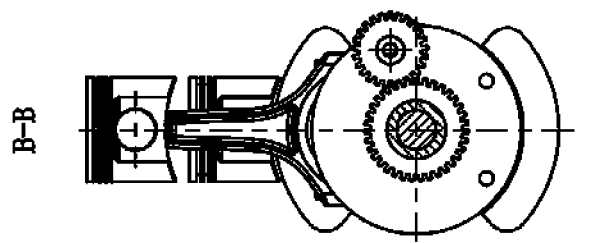
Figure 12c
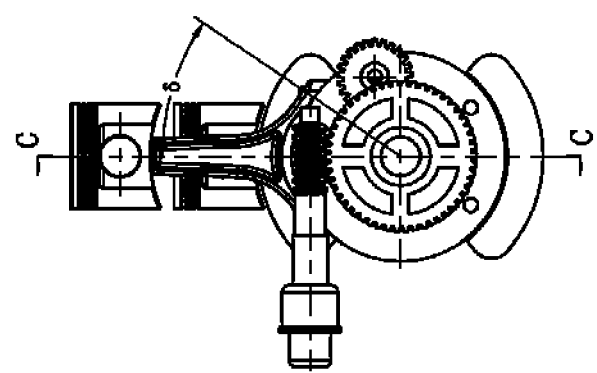
Figure 12b
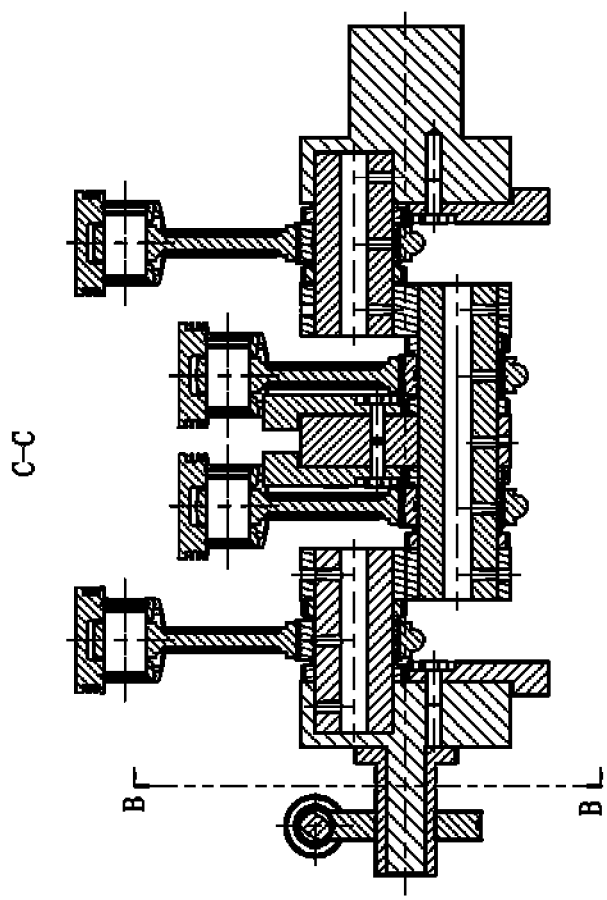
Figure 12a
Figure 12

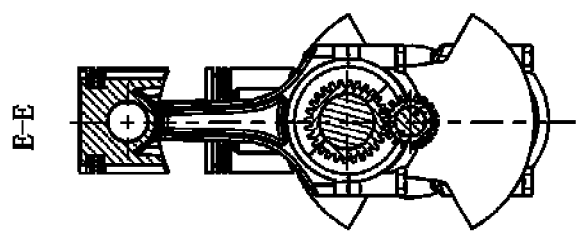
Figure 13c
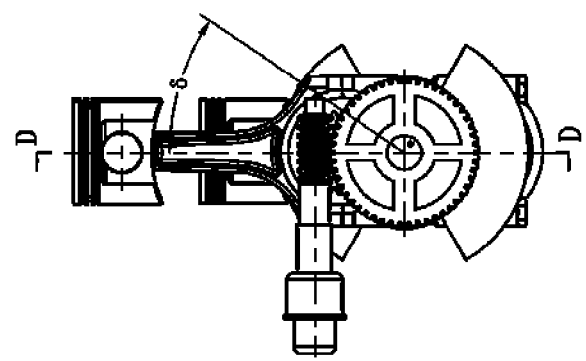
Figure 13b
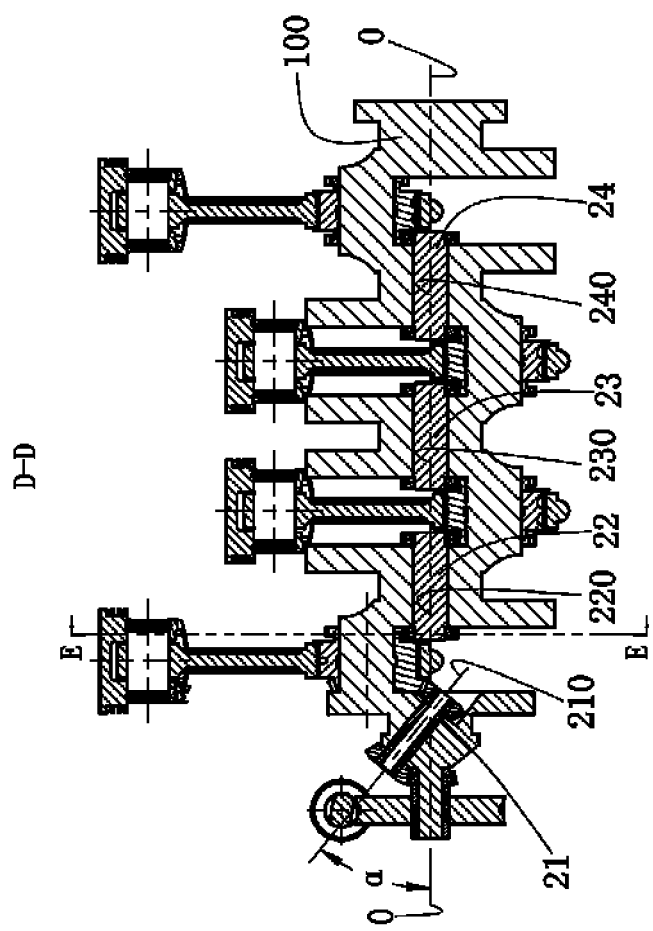
Figure 13a
Figure 13

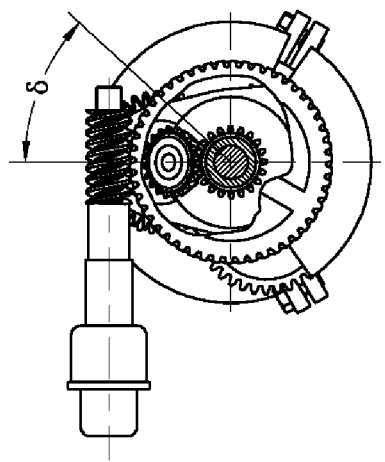
Figure 15b
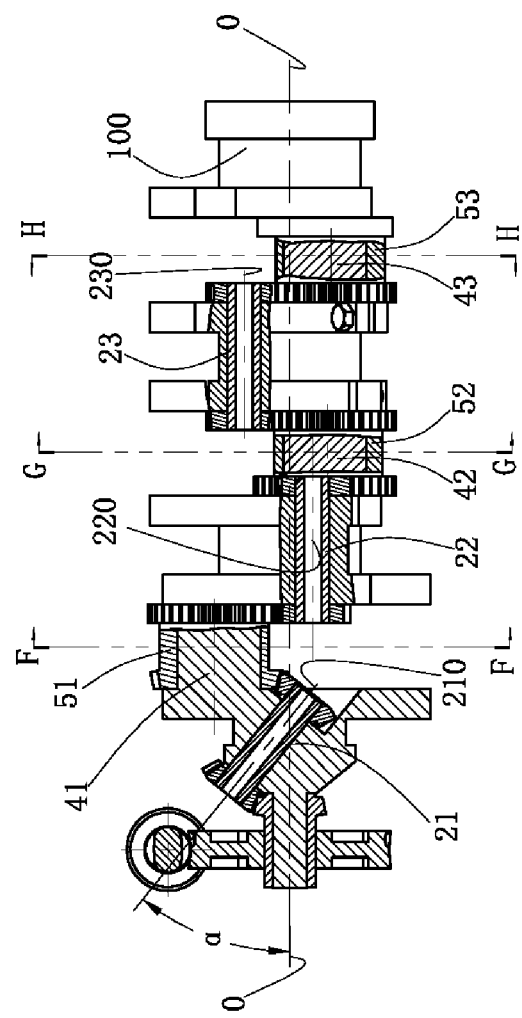
Figure 15a
Figure 15

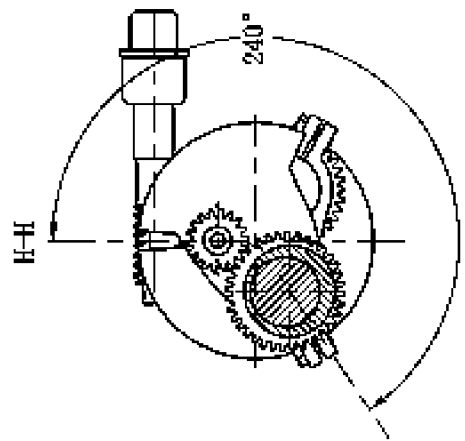
Figure 16c
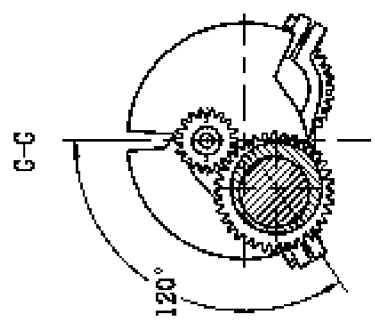
Figure 16b
Figure 16
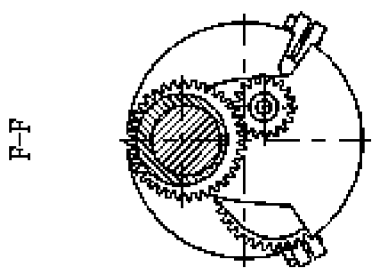
Figure 16a

APPARATUS WITH VARIABLE COMPRESSION RATIO AND VARIABLE EXPANSION RATIO

CROSS-REFERENCE TO RELATED APPLICATIONS

The subject application is a continuation of PCT/CN2014/000072 filed on Jan. 20, 2014, which claims priority on Chinese patent application 201310182783.5 filed on May 16, 2013 in China. The contents and subject matter of the PCT and Chinese priority applications are incorporated herein by reference.

TECHNICAL FIELD

The present invention relates to the technical field of the internal combustion engine, particularly, an apparatus with variable compression ratio and variable expansion ratio for various reciprocating piston engines.

BACKGROUND OF THE INVENTION

It is well known that variable compression ratio (VCR) and variable expansion ratio (VER) for the internal combustion engine is a revolutionary technology with the most development potential in today's world. The technology plays a vital role to reduce carbon emissions, oil products, biofuels, and other fuel consumption. Despite of numerous inventions in the field, no commercialized engine has gone into the market, which implies the difficulty to capture the VCR and VER internal combustion engine technology.

In 1891, U.S. Pat. No. 460,642 to Kitson discloses a structure in a thermodynamic cycle that is pivotally mounted on the crankpin and through the rotation of the eccentric sleeve, changes the lengths of all the four strokes. In 1977, U.S. Pat. No. 4,044,629 to Clarke discloses a modification to the structure of Kitson with an added changing apparatus of the eccentric sleeve rotation angle so that the internal combustion engine is conveniently used in a variety of different conditions, part load and full load. The modification makes the efficiency of the internal combustion engine to exceed that of the Miller cycle, or Atkinson cycle. Unfortunately, the apparatus in the patent can only be carried out in a single-cylinder engine, which limits the application of the patent.

In 1999, U.S. Pat. No. 5,927,236 to Gonzalez and other similar patents have the same or similar effects of the one to Clark, however, because either the strength of the crankshaft is greatly reduced or the set of driving mechanism is too complex, it is difficult to achieve reliable operation with low cost. Thus, there is no practical use of the technology.

In 2002, U.S. Pat. No. 6,349,684 to De Gooijer achieves the same function as the patent to Clark and the apparatus may be used in two cylinders, four cylinders, and V-type internal combustion engines, which is the famous "GoEngine." The efficiency of the VCR and VER engine is greatly enhanced. The apparatus in the patent is relatively simple, however, the planetary gear of the apparatus is placed in the main journal of the crankshaft, and in order to ensure the operation of the planetary gear, a huge space has been dug inside the main journal for placing the planetary gear, which greatly reduces the strength of the crankshaft. At the same time, the diameters of the crankpin and the planetary gear are designed to be smaller because of the limitation of the structure, thus, it is difficult to improve the strength of the crankshaft by increasing the size. In addition, the diameter of the ring gear is large while the meshing speed between the planetary gear and the ring gear is high, and the rigidity of the ring gear is insufficient, which impacts the NVH performance of internal combustion engine.

SUMMARY OF THE INVENTION

The present invention provides an apparatus with variable compression ratio and variable expansion ratio for the internal combustion engine that overcomes the shortcomings of the existing technology. In the apparatus of the present invention, the eccentric sleeve is pivotally installed on the crankpin of the crankshaft, and the compression ratio is changed by rotating the eccentric sleeve. Under the lower load conditions of the internal combustion engine, compression ratio and expansion ratio are increased, while the length of exhaust stroke is cut down, the in-cylinder EGR is enhanced, the length of the intake stroke is reduced, the pumping loss is decreased, and the efficiency of the internal combustion engine is improved. Under the higher load conditions of the internal combustion engine, compression ratio is depressed, the charge is enhanced, the output of the engine is increased, while engine knock is prevented.

The present invention provides an apparatus with variable compression ratio and variable expansion ratio for the internal combustion engine that is mounted on the engine crankshaft and the assembly of the piston-connecting rod, the crankshaft comprises a first main journal and a plurality of other main journals of the following order as well as the first crankpin and a plurality of other crankpins of the following order, the assembly of the piston-connecting rod comprises a bearing bush on the big end of the connecting rod, wherein a first supporting cylindrical hole is placed in the first main journal, an angle $\alpha \neq 0$ between an axis of the first supporting cylindrical hole and the crankshaft, each of the plurality of the other main journal is provided respectively with a supporting cylindrical hole, the axis of each supporting cylindrical hole is coaxial with the axis of the crankshaft, or not coaxial but parallel, or forms non-zero angles between the axis of each supporting cylindrical hole and the axis of the crankshaft.

The apparatus of the present invention comprises an actuating motor fixed on the cylinder block of engine;

a worm connected fixedly coaxially together with the actuating motor;

a worm gear meshed with the worm;

a sun gear fixed coaxially on the worm gear and mounted pivotally on the crankshaft;

a first transmission shaft, which can be rotated to put into the first supporting cylindrical hole, and both ends of the first transmission shaft extending out of the supporting cylindrical hole;

a plurality of transmission shafts, having the same number corresponding to the plurality of the main journals, respectively, and can be rotatably positioned one-to-one in the other supporting cylindrical holes, and both ends of the plurality of transmission shafts extending out of the support cylindrical holes;

a first eccentric sleeve, which can be rotatably sleeved between the first crankpin of the crankshaft and the corresponding bearing bush of the big end of the connecting rod, comprising an inner cylindrical surface and an outer cylindrical surface, a center line of the inner cylindrical surface and a center line of the external cylindrical surface do not coincide and has an eccentricity e;

a plurality of eccentric sleeves, in the same quantity as the plurality of the crankpins, respectively, can be rotatably sleeved between the plurality of the crankpins and the corresponding bearing bushes of the big end of the connecting rods, comprising an inner cylindrical surface and an outer cylindrical surface, a center line of the inner cylindrical surface and a center line of the external cylindrical surface do not coincide and has an eccentricity e;

a front gear of the first eccentric sleeve, fixed installation on a front end of the first eccentric sleeve, a pitch circle center of the front gear of the first eccentric sleeve and the center of the inner cylindrical surface of the eccentric sleeve coincide;

a plurality of the front gear of the eccentric sleeves, respectively, fixed installation on the front end of the corresponding eccentric sleeves, the pitch circle center of the plurality of the front gear of the eccentric sleeves and the center of the inner cylindrical surface of the corresponding eccentric sleeve coincide;

a plurality of the rear gear of the eccentric sleeves, respectively, fixed installation on the rear end of the corresponding eccentric sleeves, the pitch circle center of the plurality of the rear gear of the eccentric sleeves and the center of the inner cylindrical surface of the corresponding eccentric sleeve coincide;

a planetary gear, which is fixedly mounted on the front end of the first transmission shaft, engaged with the sun gear;

a rear gear of the first transmission shaft, which is fixedly mounted on the rear end of the first transmission shaft, engaged with the front gear of the first eccentric sleeve;

a plurality of the front gear of the transmission shafts, which is respectively fixed on the front end of the corresponding transmission shafts one to one, engaged with the adjacent rear gear of the eccentric sleeves;

a plurality of the rear gear of the transmission shafts, which is respectively fixed on the rear end of the corresponding transmission shafts one to one, engaged with the adjacent front gear of the eccentric sleeves.

In the present invention, there is an angle α=0 between the axis of the first supporting cylindrical hole and the crankshaft, the axis of the first supporting cylindrical hole and the axis of the crankshaft is parallel and do not coincide;

the transmission ratio I is 1:2, which is formed by the number of teeth of the sun gear, the number of teeth of the planetary gear, the number of teeth of the rear gear of the first transmission shaft, and the number of teeth of the front gear of the first eccentric sleeve as follows $I=(Z_4/Z_{31})*(Z_{32}/Z_{61})=0.5$, Or, the transmission ratio I is 1:1, which is formed by the number of teeth of the sun gear, the number of teeth of the planetary gear, the number of teeth of the rear gear of the first transmission shaft, and the number of teeth of the front gear of the first eccentric sleeve as follows: $I=(Z_4/Z_{31})*(Z_{32}/Z_{61})=1$, In the formula, $Z_4$ is the number of teeth of the sun gear, $Z_{31}$ is the number of teeth of the planetary gear, $Z_{32}$ is the number of teeth of the rear gear of the first transmission shaft, and $Z_{61}$ is the number of teeth of the front gear of the first eccentric sleeve.

The actuating motor is a servo motor with an angle encoder, and the rotation angle of the worm is determined by the angle encoder of the motor.

The number of a plurality of crankpins is 0, 1, 2, 3, 4, or 5.

The main journals comprise the second main journal, the third main journal, and the fourth main journal, which are, respectively, provided with the second supporting cylindrical hole, the third supporting cylindrical hole and the fourth supporting cylindrical hole. The axis of the second supporting cylindrical hole and the axis of the crankshaft form an angle β2, which is not zero. The axis of the third supporting cylindrical hole and the axis of the crankshaft form an angle of zero. The axis of the fourth supporting cylindrical hole and the axis of the crankshaft form an angle β4, which is not zero.

The transmission shafts include the second transmission shaft, the third transmission shaft and the fourth transmission shaft, which are rotatably placed in the second supporting cylindrical hole, the third supporting cylindrical hole, and the fourth supporting cylindrical hole, respectively.

The crankpins include the second crankpin, the third crankpin, and the fourth crankpin.

The eccentric sleeves comprise the second eccentric sleeve, the third eccentric sleeve, and the fourth eccentric sleeve, which are rotatably sleeved respectively between the second crankpin, the third crankpin, and the fourth crankpin and corresponding to the bearing bush of the big end of connecting rod.

The front gear of the eccentric sleeves comprise the second front gear of the eccentric sleeve, the third front gear of the eccentric sleeve, and the fourth front gear of the eccentric sleeve, which are respectively fixed on the front of the second eccentric sleeve, the third eccentric sleeve, and the fourth eccentric sleeve.

The rear gear of the eccentric sleeves comprise the first rear gear of the eccentric sleeve, the second rear gear of the eccentric sleeve, and the third rear gear of the eccentric sleeve, which are respectively fixed on the rear of the first eccentric sleeve, the second eccentric sleeve, and the third eccentric sleeve.

The front gears of the transmission shafts comprise the front gear of the second transmission shaft, the front gear of the third transmission shaft, and the front gear of the fourth transmission shaft, which are respectively fixed on the front end of the second transmission shaft, the third transmission shaft, and the fourth transmission shaft. The front gears of the transmission shafts are meshed respectively with the front adjacent eccentric sleeve's rear gears of the first eccentric sleeve, the second eccentric sleeve, and the third eccentric sleeve;

The rear gears of the transmission shafts comprise the rear gear of the second transmission shaft, the rear gear of the third transmission shaft, and the rear gear of the fourth transmission shaft, which are respectively fixed on the rear end of the second transmission shaft, the third transmission shaft, and the fourth transmission shaft. And the rear gears of the transmission shafts are meshed respectively with the rear adjacent eccentric sleeve's front gears of the second eccentric sleeve, the third eccentric sleeve, and fourth eccentric sleeve.

The apparatus with the variable compression ratio and variable expansion ratio of the present invention are used in a single cylinder or multi cylinder internal combustion inline engine, V type, W type, star or opposed layout of multi cylinder internal combustion engine.

The beneficial effect of the present invention is:

1. The present invention fully improves the performance evaluation of the internal combustion engine, especially the fuel consumption decreased significantly.

2. The present invention provides a good combustion environment in the cylinder chamber of internal combustion engine under various application conditions, which greatly reduces the harmful emissions of internal combustion engine.

3. Due to the variable compression ratio, the internal combustion engine of the present invention using what grade of gasoline combustion is no longer sensitive; it can be a variety of different kinds of fuel and even burning liquefied natural gas, compressed natural gas, alcohol and other different kinds of fuel. There was no need of modification to the internal combustion engine.

4. The apparatus of the present invention has the advantages of using only one drive system, the drive motion can be transmitted smoothly from the front end of the crankshaft through the main journals to the first eccentric sleeve, delivered to the eccentric sleeves of the second, third, the fourth even more, while at the same time, there is no adverse effects to the strength of crankshaft. That is, the present invention adopts the existing similar structure and ordinary materials in internal combustion engine, it achieved the objective of changing compression ratio and expansion ratio, which means that in all of the VCR and VER scheme, the present invention provides a low cost, simple and reliable technical proposal, the internal combustion engine of the invention can be really put into commercial production.

5. The present invention adopts a worm and worm gear with a large reduction ratio, the needed torque of actuating motor for driving mechanism is very small, the actuating power of the motor is less than 150 W, for 100 kW of power of the internal combustion engine, the power consumption of the motor can be neglected; It is very quickly for the action of the driving mechanism to be performed, the maximum period of stroke adjustment does not exceed 500 milliseconds, usually be adjusted, only less than 50 milliseconds, it means when the engine is running for 1 to 3 cycles the actuating motor can be adjusted in place, when necessary, may shorten the adjustment time;

In addition, the adjustment precision for the piston phase is very high, the error does not exceed 0.3 DEG crank angle; when the eccentric sleeves sleeved on the crankpins are affected by explosion pressure from cylinder, reciprocating inertia force and/or crank centrifugal force, an additional torque acting on the eccentric sleeves in the direction of clockwise or counterclockwise rotation around crankpin is produced, due to the feature of worm and worm gear with reverse self-locking, the additional torque is unable to pass on to the actuating motor through the worm and worm gear, to ensure the reliable operation of the actuating motor. Thus the present invention has the advantages of accuracy, fast, reliability and lower power consumption.

I: position: $θ_0=0°$, I=0.5, Φ=0° or 720°, θ=0° or −360°; II: position: $θ_0=0°$, I=0.5, Φ=90°, θ=−45°; III: position: $θ_0=0°$, I=0.5, Φ=180°, θ=−90°; IV: position: $θ_0=0°$, I=0.5, Φ=270°, θ=−135°; V: position: $θ_0=0°$, I=0.5, Φ=360°, θ=−180°; VI: position: $θ_0=0°$, I=0.5, Φ=450°, θ=−225°; VII: position: $θ_0=0°$, I=0.5, Φ=540°, θ=−270°; VIII: position: $θ_0=0°$, I=0.5, Φ=630°, θ=−315°.

Figures 2, 2A, 2B:
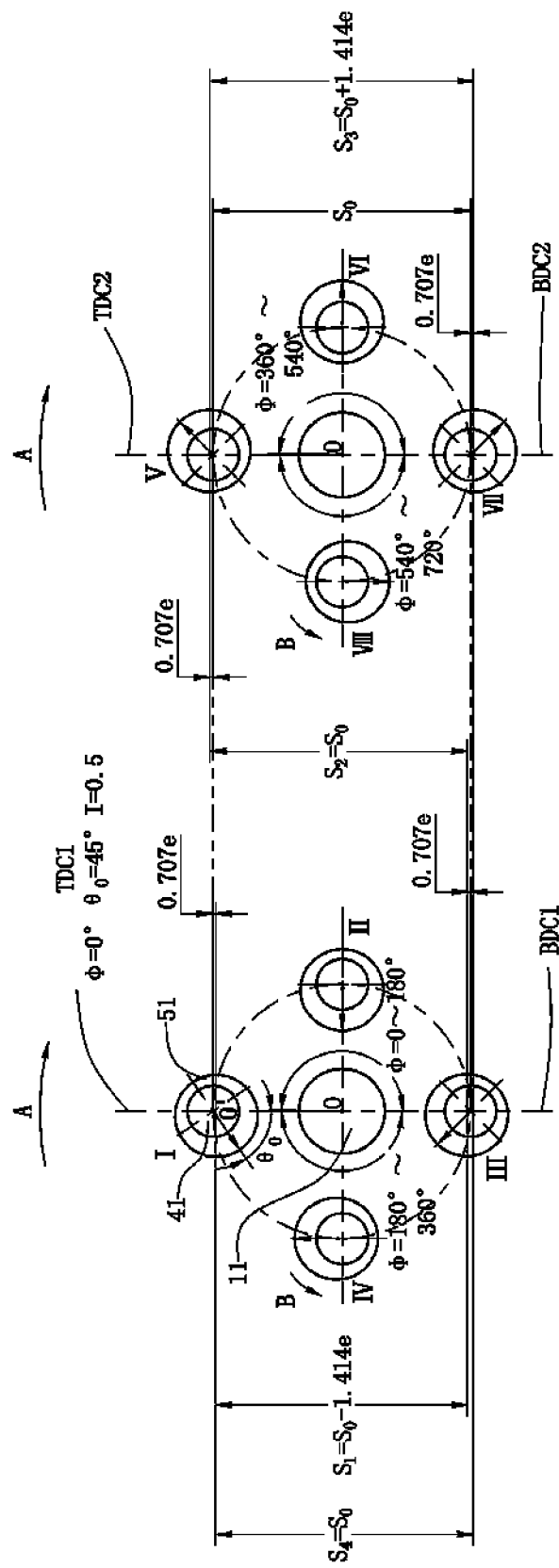

FIG. 2 shows the stroke variation of the internal combustion engine when the engine is running in low and medium load condition, with FIG. 2a showing the positions I, II, III, and IV; FIG. 2b showing the positions V, VI, VII, and VIII. The reference numbers and characters used refer to: I: position: $θ_0=45°$, I=0.5, Φ=0° or 720°, θ=45° or −315°; II: position: $θ_0=45°$, I=0.5, Φ=90°, θ=0°; III: position: $θ_0=45°$, I=0.5, Φ=180°, θ=−45°; IV: position: $θ_0=45°$, I=0.5, Φ=270°, θ=−90°; V: position: $θ_0=45°$, I=0.5, Φ=360°, θ=−135°; VI: position: $θ_0=45°$, I=0.5, Φ=450°, θ=−180°; VII: position: $θ_0=45°$, I=0.5, Φ=540°, θ=−225°; VIII: position: $θ_0=45°$, I=0.5, Φ=630°, θ=−270°.

Figures 3, 3A, 3B:
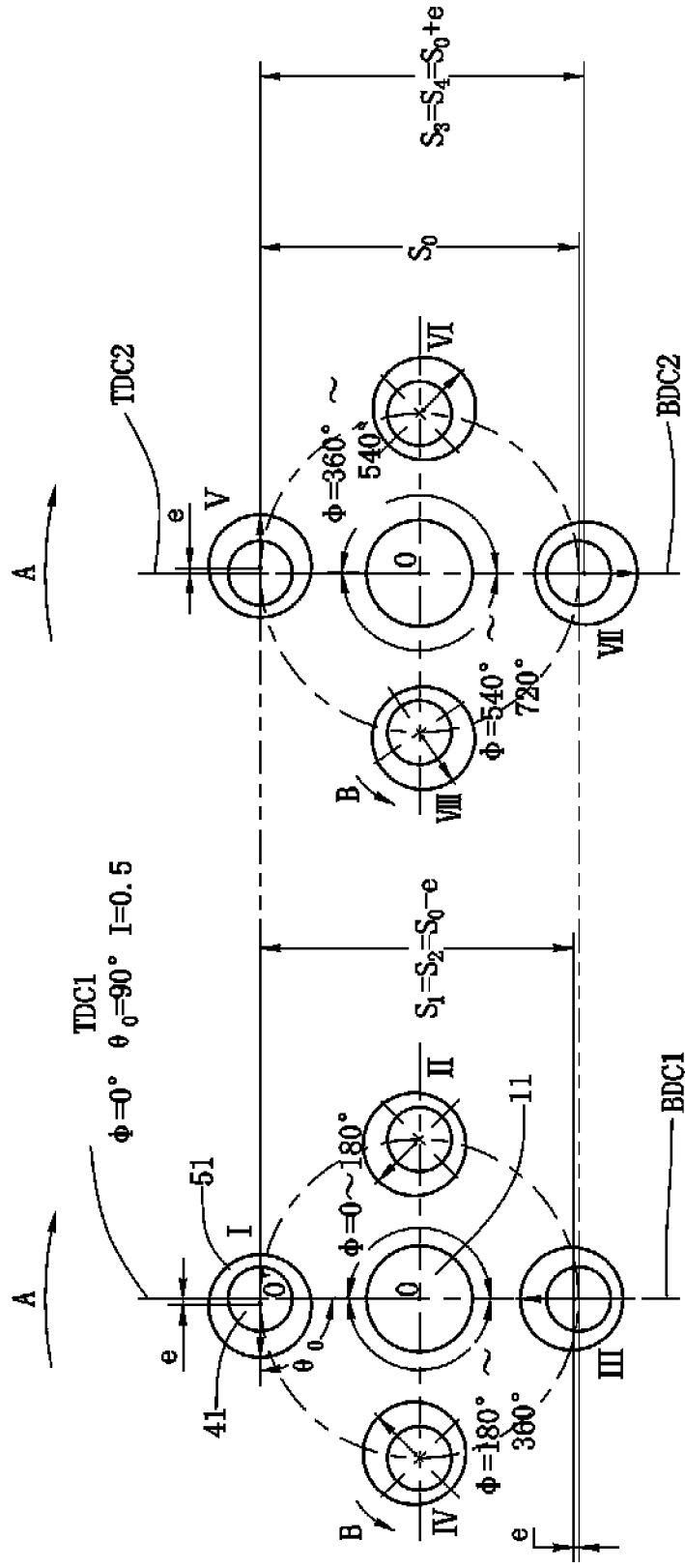

FIG. 3 shows the stroke variation of the internal combustion engine when the engine is running in medium and high load condition, with FIG. 3a showing the positions I, II, III, and IV; FIG. 3b showing the positions V, VI, VII, and VIII. The reference numbers and characters used refer to $θ_0=90°$, I=0.5, in the position corresponding to the I, II, III, IV, V, VI, VII and VIII, the rotating angle θ of the first eccentric sleeve in accordance with the following formula: $θ=θ_0-0.5Φ$.

Figure 4:
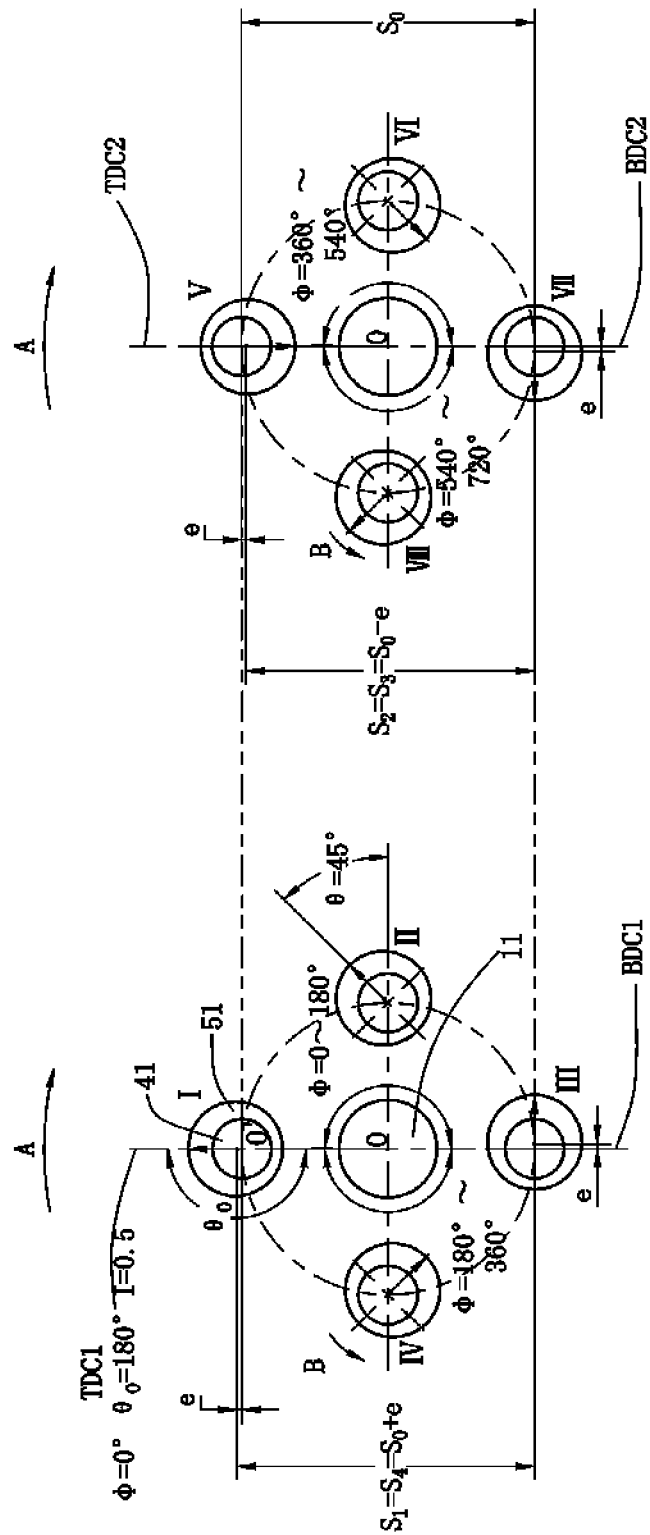

FIG. 4 shows the stroke variation of the internal combustion engine when the engine is running in high load condition, with FIG. 4a showing the positions I, II, III, and IV; FIG. 4b showing the positions V, VI, VII, and VIII. The reference numbers and characters used refer to $θ_0=180°$, I=1, in the position corresponding to the I, II, III, IV, V, VI, VII and VIII, the rotating angle θ of the first eccentric sleeve in accordance with the following formula: $θ=θ_0-0.5Φ$.

Figure 5:
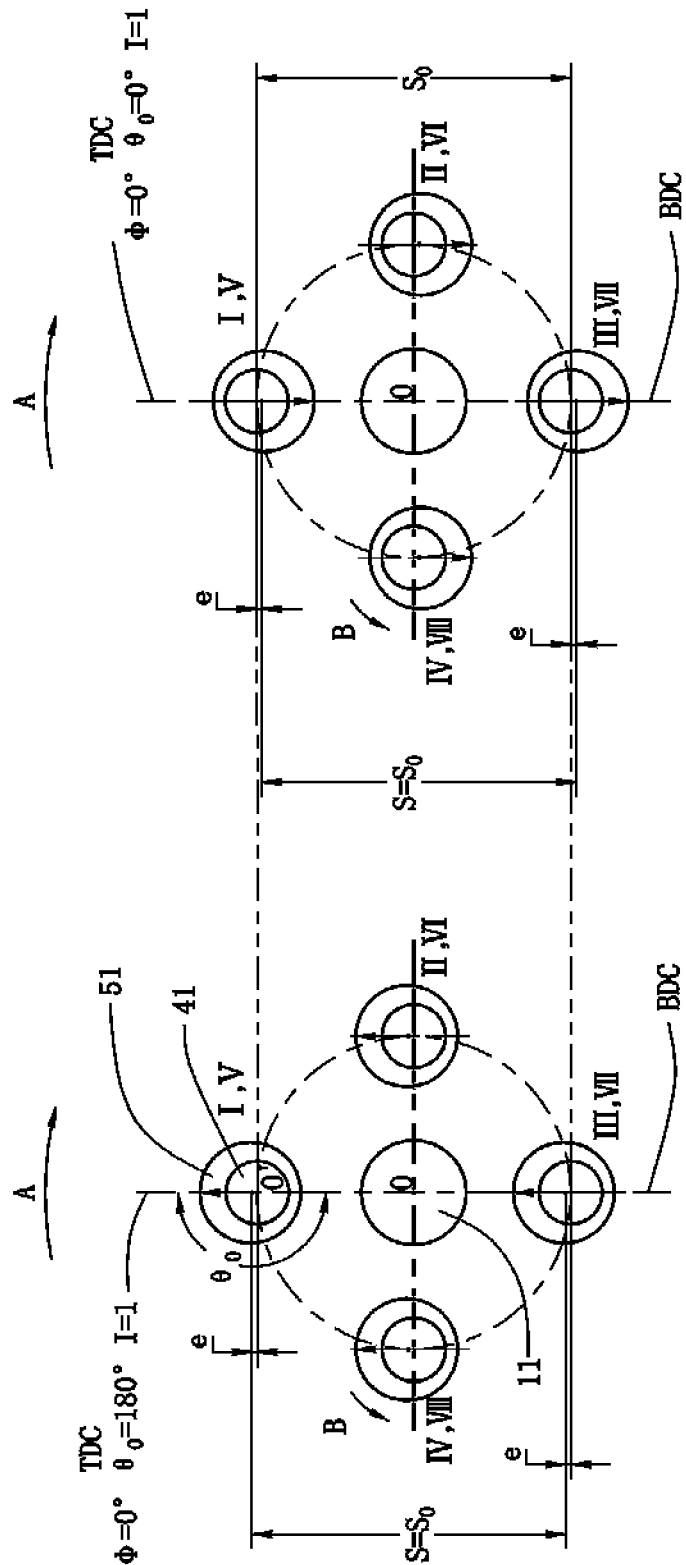

FIG. 5 shows the stroke variation of the internal combustion engine, with FIG. 5a showing the stroke variation of the internal combustion engine when the engine is running in low load condition, when $θ_0=180°$, I=1, in the position corresponding to the I, II, III, IV, V, VI, VII and VIII, the rotating angle θ of the first eccentric sleeve in accordance with the following formula: $θ=θ_0-Φ$; FIG. 5b showing the stroke variation of the internal combustion engine when the engine is running in high load condition, when $θ_0=0°$, I=1, in the position corresponding to the I, II, III, IV, V, VI, VII and VIII, the rotating angle θ of the first eccentric sleeve in accordance with the following formula: $θ=θ_0-Φ$.

Figure 6:
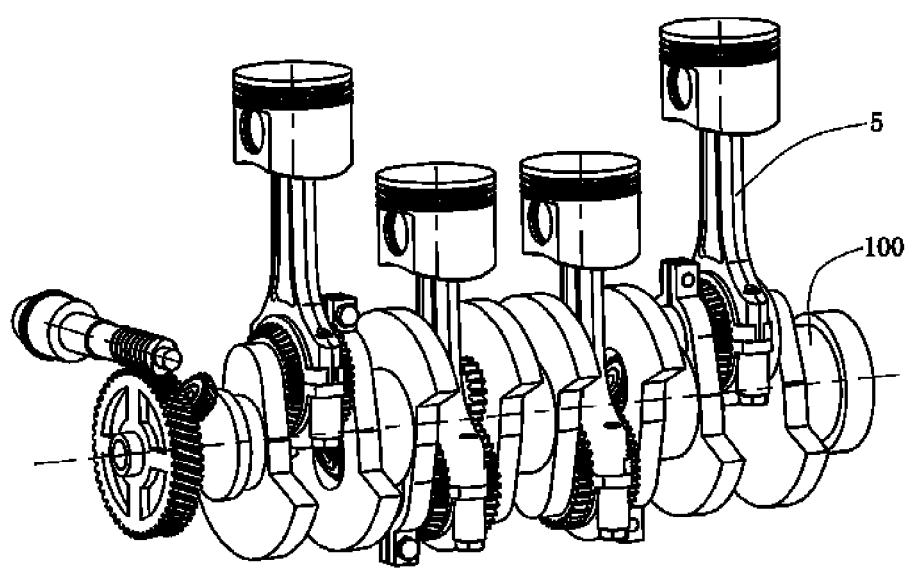

FIG. 6 is an axonometric drawing showing the structure of the apparatus of an embodiment 1 of the present invention.

Figure 7:
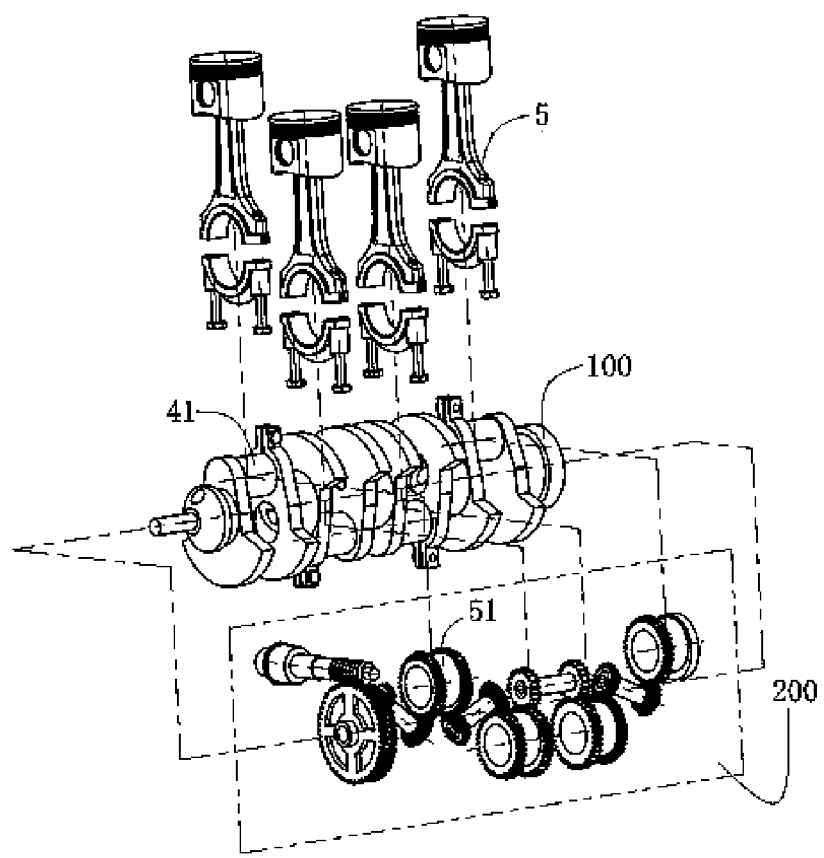

FIG. 7 is an exploded view showing the structure of the embodiment 1 of the present invention.

Figure 8:
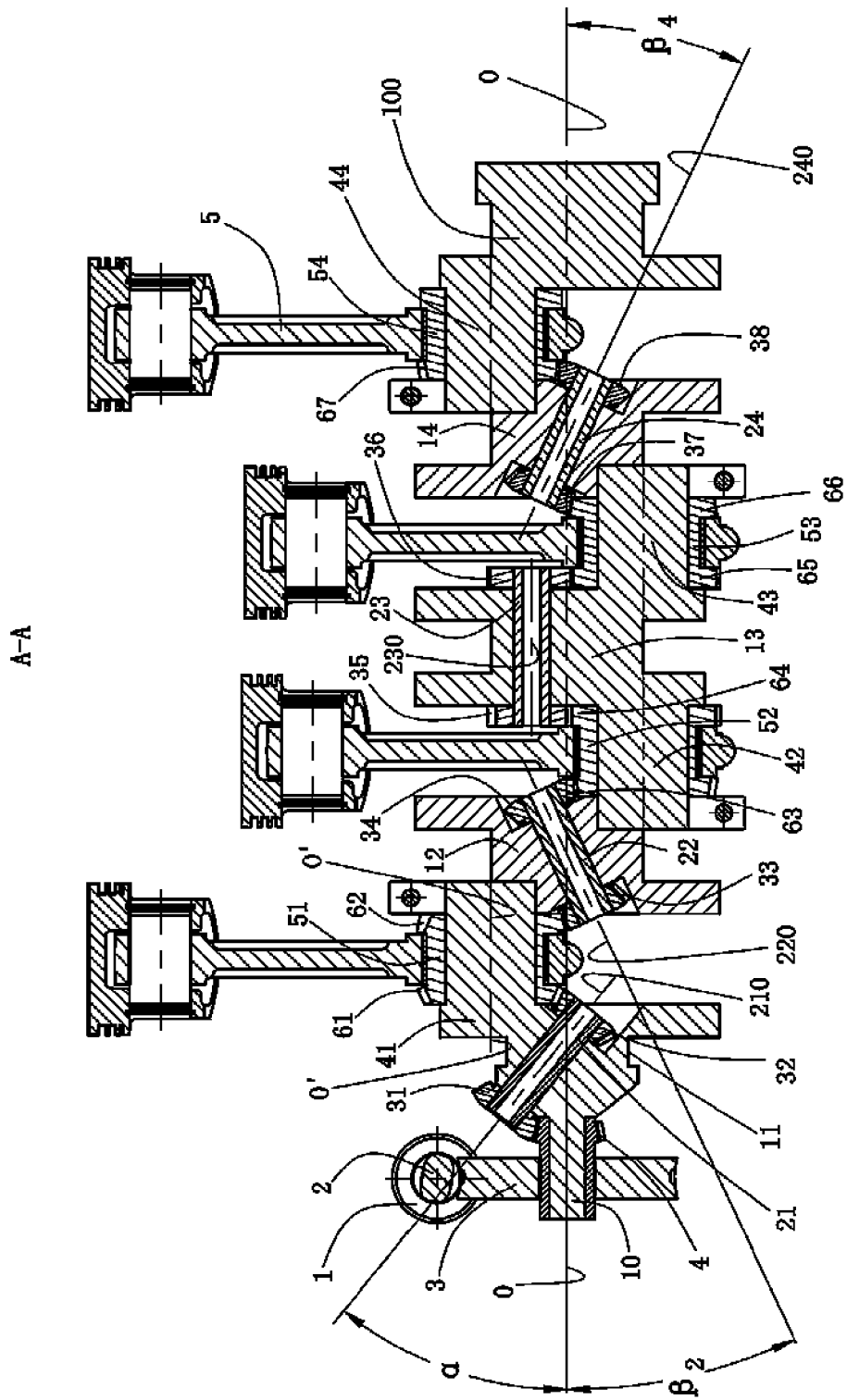

FIG. 8 is a transverse cross-section plan for the embodiment 1 of the present invention.

Figure 9:
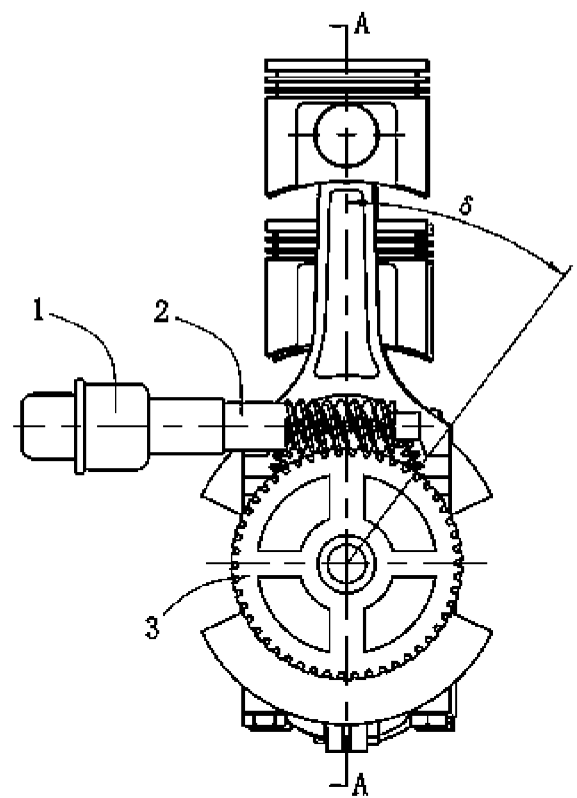

FIG. 9 is a side view plan of the embodiment 1 of the present invention as in FIG. 8.

Figure 10:
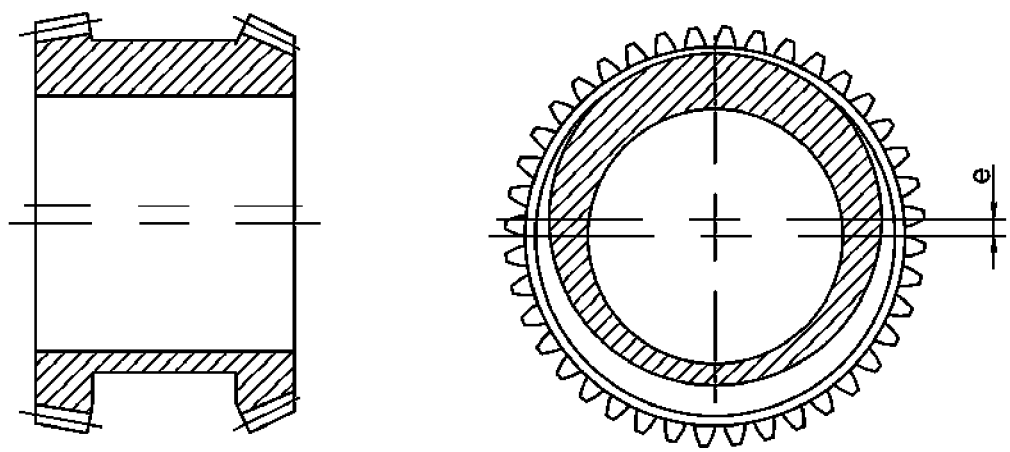

FIG. 10 is a diagrammatic sketch of the present invention showing the eccentric sleeve, the front gear, and the rear gear of the eccentric sleeve.

Figure 11:
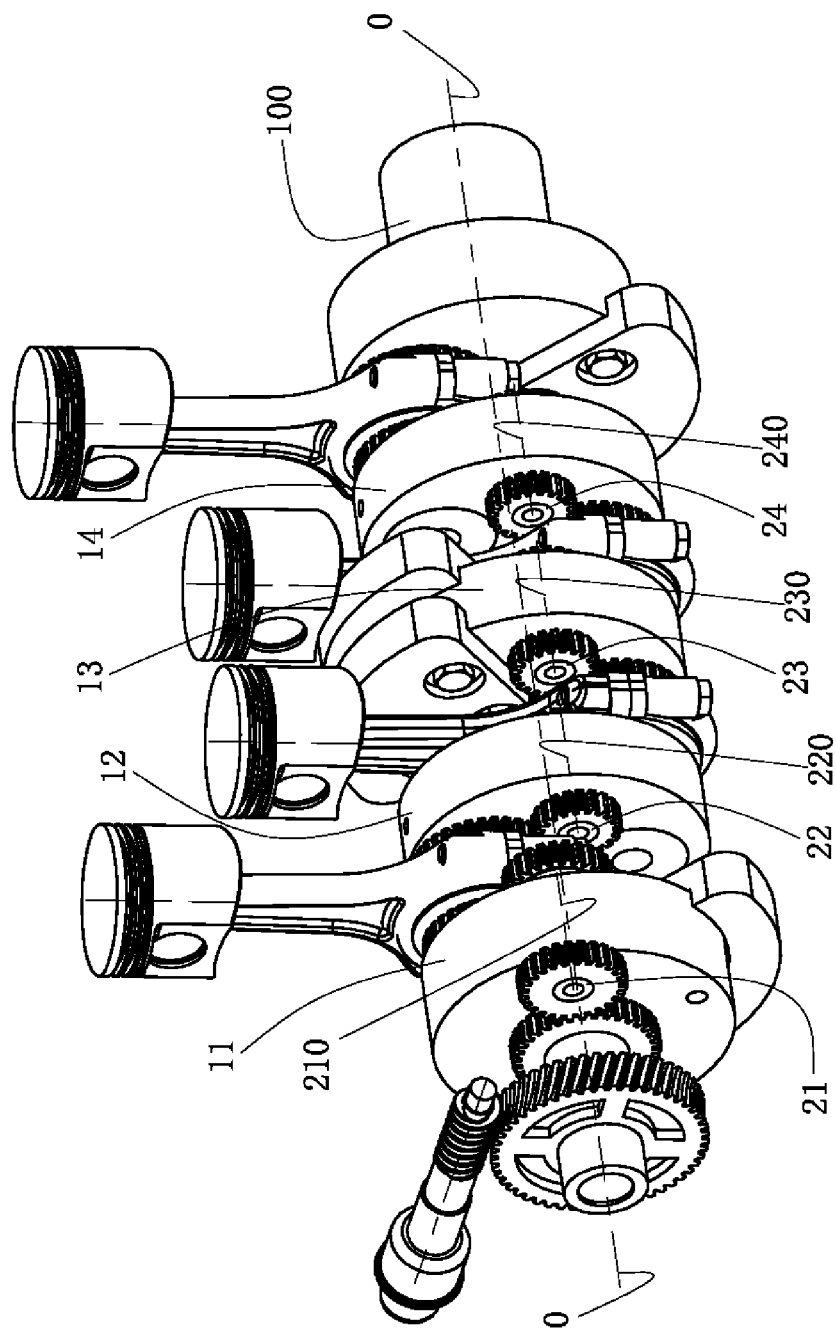

FIG. 11 is an axonometric drawing showing the structure of the apparatus of an embodiment 2 of the present invention.

FIG. 12 shows details of the structure of the embodiment 2 of the present invention, with FIG. 12a showing the transverse cross-section plan for the embodiment 2 of the present invention, and FIG. 12b showing the side view plan along C-C as shown in FIG. 12a, and FIG. 12c showing the B-B sectional view of FIG. 12a.

FIG. 13 shows details of the structure of the embodiment 3 of the present invention, with FIG. 13a showing the transverse cross-section plan for the embodiment 3 of the present invention, FIG. 13b showing the side view plan of FIG. 13a along D-D, and FIG. 13c showing E-E sectional view of FIG. 13a.

Figure 14:
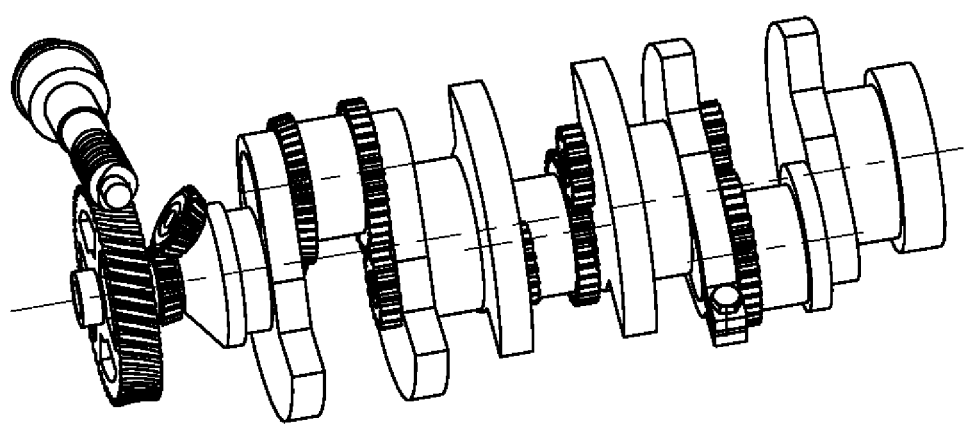

FIG. 14 is an axonometric drawing showing the structure for an embodiment 5 of the present invention.

FIG. 15 shows details of the structure of the embodiment 5 of the present invention, with FIG. 15a showing the transverse cross-section plan for the embodiment 5 of the present invention, and FIG. 15b showing the side view plan of the structure as shown in FIG. 15a.

FIG. 16 shows further details of the structure of the embodiment 5 of the present invention, with FIG. 16a showing the F-F sectional view of the structure as shown in FIG. 15a, FIG. 16b showing the G-G sectional view of the structure as shown in FIG. 15a, and FIG. 16c showing the H-H sectional view of the structure as shown in FIG. 15a.

The reference numbers used in the figures correspond to the following elements:
1. Actuating motor, 2. Worm, 3. Worm gear, 4. Sun gear, 5. Assembly of the piston-connecting rod, 10. Front journal, 11. First main journal, 12. Second main journal, 13. Third main journal, 14. Fourth main journal, 21. First transmission shaft, 22. Second transmission shaft, 23. Third transmission shaft, 24. Fourth transmission shaft, 31. Planetary gear, 32. Rear gear of the first transmission shaft, 33. Front gear of the second transmission shaft, 34. Rear gear of the second transmission shaft, 35. Front gear of the third transmission shaft, 36. Rear gear of the third transmission shaft, 37. Front gear of the fourth transmission shaft, 38. Rear gear of the fourth transmission shaft, 41. First crankpin, 42. Second crankpin, 43. Third crankpin, 44. Fourth crankpin, 51. First eccentric sleeve, 52. Second eccentric sleeve, 53. Third eccentric sleeve, 54. Fourth eccentric sleeve, 61. Front gear of the first eccentric sleeve, 62. Rear gear of the first eccentric sleeve, 63. Front gear of the second eccentric sleeve, 64. Rear gear of the second eccentric sleeve, 65. Front gear of the third eccentric sleeve, 66. Rear gear of the third eccentric sleeve, 67. Front gear of the fourth eccentric sleeve, 100. Crankshaft, 200. The apparatus of variable compression ratio and variable expansion ratio, 210. Axis of the first transmission shaft, 220. Axis of the second transmission shaft, 230. Axis of the third transmission shaft, 240. Axis of the fourth transmission shaft, 0-0 Axis of the crank shaft, 0'-0' Axis of the first crankpin, α Angle between the axis of the first transmission shaft and the axis of the crankshaft, $\beta_2$ Angle between the axis of the second transmission shaft and the axis of the crankshaft, $\beta_4$ Angle between the axis of the fourth transmission shaft and the axis of the crankshaft, δAngle between the center line of the cylinder and the worm gear, Φ Crankshaft angle, θ Angle of the first eccentric sleeve relative to the first crankpin, and $\theta_0$ Initial angle of the first eccentric sleeve.

DETAILED DESCRIPTION OF THE INVENTION AND EMBODIMENTS

The present invention provides apparatus with variable compression ratio and variable expansion ratio for an internal combustion engine. The apparatus makes the internal combustion engine advantageously changed to improve the efficiency in suction, compression, expansion, and exhaust strokes in one thermodynamic cycle, at the same time, the internal combustion engine gets higher efficiency regardless of whether in full load or partial load.

Referring to FIG. 7, apparatus 200 with variable compression ratio and variable expansion ratio of the internal combustion engine is mounted on the engine crankshaft 100 and the assembly 5 of the piston-connecting rod; the crankshaft 5 comprises the front main journal, the first main journal, and a plurality of other main journals one by one, the first crankpin 41 and a plurality of other crankpins of the following order and rear main journal.

There is a first supporting cylindrical hole in the first main journal, and there is an angle α≠0 between the axis of the first supporting cylindrical hole and the crankshaft, or the angle α=0 and the axis of the first supporting cylindrical hole and the axis of the crankshaft are parallel and do not coincide.

Each of the plurality of main journal is provided respectively with a supporting cylindrical hole, The axis of each supporting cylindrical hole is coaxial with the axis of the crankshaft, or not coaxial but parallel, or forms non-zero angles between the axis of each supporting cylindrical hole and the axis of the crankshaft.

When the axis of the supporting cylindrical hole is parallel but not coaxial with the axis of the crankshaft, the position of the axis of the supporting cylindrical hole can be located in the left or the right side of the center of the main journal.

The number of a plurality of crankpins is 0, 1, 2, 3, 4, or 5, in other words, the apparatus of the present invention can be used in a single cylinder, or two cylinder, three cylinder, four cylinder, five cylinder, six cylinder and so on, the multi cylinder internal combustion engine, including single cylinder or multi cylinder inline internal combustion engine, V type, W type, star or opposed layout multi cylinder internal combustion engine.

The assembly 5 of the piston-connecting rod comprises piston and bearing bush on the big end of connecting rod, the piston is movably mounted within the cylinder of the internal combustion engine, a bearing bush was mounted in the big hole of the connecting rod.

The apparatus comprises an actuating motor, a worm, a worm gear, a sun gear, a first transmission shaft, a plurality of transmission shafts, a first eccentric sleeve, a plurality of eccentric shafts, a front gear of the first eccentric sleeve, a plurality of front gears of eccentric shafts, a plurality of rear gears of eccentric shafts, a planetary gear, a rear gear of the first transmission shaft, a plurality of front gears of transmission shafts and a plurality of rear gears of transmission shafts.

The actuating motor is a servo motor with an angle encoder, which is fixed on the cylinder block of engine.

The worm is connected fixedly together with the actuating motor, and the axis of the worm coincides with the axis of the actuating motor; and the rotation angle of the worm is determined by the angle encoder of the actuating motor.

The worm gear is engaged with the worm, adopted large reduction ratio, such as 50:1, and possesses a reverse motion self-locking function.

The sun gear, which is fixed coaxially on the worm gear, is mounted rotatably on the crankshaft.

The first transmission shaft can be rotated to put into the first supporting cylindrical hole, and both ends of the transmission shaft extended out of the support cylindrical hole.

The plurality of transmission shafts, same quantity with the plurality of main journals, respectively, can be rotatably positioned one-to-one in the supporting cylindrical holes, and both ends of the plurality of transmission shafts extended out of the support cylindrical holes.

The first eccentric sleeve, which can be rotatably sleeved between the first crankpin of the crankshaft and corresponding the bearing bush of the big end of the connecting rod, comprises an inner cylindrical surface and the outer cylindrical surface, the center line of the inner cylindrical surface and the center line of the external cylindrical surface do not coincide and has an eccentricity e.

The plurality of eccentric sleeves, same quantity with the plurality of crankpins, respectively, can be rotatably sleeved between the plurality of crankpins and corresponding the bearing bushes of the big end of the connecting rods, comprises an inner cylindrical surface and the outer cylindrical surface, the center line of the inner cylindrical surface and the center line of the external cylindrical surface do not coincide and has an eccentricity e.

The first eccentric sleeve and a plurality of eccentric sleeve can be composed by two semicircle sleeves, which were connected with bolts, and also can be a whole eccentric sleeve. A bearing bush is installed inside the cylindrical surface of the eccentric sleeve.

The front gear of the first eccentric sleeve, fixedly installed on front end of the first eccentric sleeve, the pitch circle center of the front gear of the first eccentric sleeve and the center of the inner cylindrical surface of the eccentric sleeve coincide.

The plurality of the front gear of the eccentric sleeves, respectively, fixedly installed on the front end of the corresponding eccentric sleeves, the pitch circle center of the plurality of the front gear of the eccentric sleeves and the center of the inner cylindrical surface of the corresponding eccentric sleeve coincide.

The plurality of the rear gear of the eccentric sleeves, respectively, fixedly installed on the rear end of the corresponding eccentric sleeves, the pitch circle center of the plurality of the rear gear of the eccentric sleeves and the center of the inner cylindrical surface of the corresponding eccentric sleeve coincide.

The planetary gear, which is fixedly mounted on the front end of the first transmission shaft, engaged with the sun gear.

The rear gear of the first transmission shaft, which is fixedly mounted on the rear end of the first transmission shaft, engaged with the front gear of the first eccentric sleeve.

The plurality of the front gear of the transmission shafts, which is respectively fixed on the front end of the transmission shafts one to one, engaged with the rear gear of the eccentric sleeves front adjacent to the eccentric sleeve.

The plurality of the rear gear of the transmission shafts, which is respectively fixed on the rear end of the transmission shafts one to one, engaged with the adjacent front gear of the eccentric sleeves rear adjacent to the eccentric sleeves.

The teeth of all gears can be straight teeth, skew tooth or curved (helical) teeth.

The transmission ratio I is 1:2, which I is formed by the number of teeth of the sun gear, the number of teeth of the planetary gear, the number of teeth of the rear gear of the first transmission shaft, and the number of teeth of the front gear of the first eccentric sleeve, that is, $I=(Z_4/Z_{31})*(Z_{32}/Z_{61})=0.5$;

Or, the transmission ratio I is 1:1, which I is formed by the number of teeth of the sun gear, the number of teeth of the planetary gear, the number of teeth of the rear gear of the first transmission shaft, and the number of teeth of the front gear of the first eccentric sleeve, that is, $I=(Z_4/Z_{31})*(Z_{32}/Z_{61})=1$, and in the formula, $Z_4$ is the number of teeth of the sun gear, $Z_{31}$ is the number of teeth of the planetary gear, $Z_{32}$ is the number of teeth of the rear gear of the first transmission shaft, and $Z_{61}$ is the number of teeth of the front gear of the first eccentric sleeve.

In the present invention, in the apparatus with variable compression ratio and variable expansion ratio, the driving system successively drives the eccentric sleeves on the crankpins to rotate an angle variant through the transmission mechanism, realized the change of the stroke length of the engine, thus changed the ratio of the compression and expansion of the engine.

The driving mechanism of the apparatus of the present invention only adopts a actuating motor, a worm, a worm gear, a sun gear, a planetary gear, that is: there is only one power source and one set of driving system, therefore, it has advantage of simple structure, less consumption, low cost, reliable and response quick. The mechanism composed by actuating motor, worm, worm gear, sun gear and planetary gear can be located in the front, rear, and even in the middle part of the crankshaft.

The transmission mechanism of the present invention is composed of the transmission shafts, the front and rear gears of the transmission shaft, and the front and rear gears of the eccentric sleeves. When the front gear of the eccentric sleeve is driven to rotate by the rear gear of the transmission shaft that meshed with the front gear of eccentric sleeve, the eccentric sleeve and its rear gear will be driven to rotate, further, to make rotation the front gear of the transmission shaft, which meshed with the rear gear of the eccentric sleeve, thus a transmission chain gradually transfers the motion to each of the eccentric sleeves.

The eccentric sleeve of the present invention is a component that rotates to change the length of the strokes, when the eccentric sleeve rotates around the crankpin, the center of the outside cylindrical surface of the eccentric sleeve will rotates around the center of the inner cylindrical surface of the eccentric sleeve with radius to the eccentricity e, the rotation of the eccentric sleeves around the respective crankpins changed the trajectory of the piston of internal combustion engine, and make all strokes of suction, compression, expansion and exhaust to change in a thermodynamic cycle of internal combustion engine.

The apparatus with variable compression ratio and variable expansion ratio is suitable for the single cylinder or multi cylinder internal combustion inline engine, also for V type, W type, star or opposed layout multi cylinder internal combustion engine.

The working principle of the present invention is as follows: internal combustion engine through the judgment for the angle of encoder that is carried by the actuating motor, captured the value of the angle $\delta$ of the worm gear, this angle $\delta$ has determined the initial angle $\theta_0$ of the eccentric sleeve, and the actual compression ratio and expansion ratio at this moment, engine ECU (not shown) through comparing with the intention of the driver's operation, calculates the required adjustment to the target of compression ratio, the conversion of the new worm target angle, and to the implementation of the motor a processing instruction, so that the forward or reverse adjustment. The rotation of the actuating motor drives the worm to rotate and further drives the worm gear, the sun gear, and the entire variable compression ratio and variable expansion ratio apparatus to complete the adjustment of the rotating angle of the all eccentric sleeves relative to the respective crankpins and reach the purpose of changing the compression ratio and expansion ratio of engine.

When you need to change the engine compression ratio and expansion ratio, the actuating motor drives the worm, to make worm gear meshed with worm, and the sun gear to rotation around the center of the crankshaft, and drives the planetary gear, the first transmission shaft and the rear gear of the first transmission shaft, and the front gear of the first eccentric sleeve and the first eccentric sleeve that sleeved on the first crankpin to rotate; Sequentially, the rear gear of the first eccentric sleeve drives the front and rear gears of the transmission shafts, the front and rear gears of eccentric sleeves that meshed each other to rotation, further, drives each eccentric sleeve at the rear part to rotate, and thus, the rotational movement of the actuating motor changed to the rotational movement of the eccentric sleeves in accordance with the provisions of transmission ratio in the synchronous rotation in the same direction of the eccentric sleeves.

When the actuating motor does not rotate and the crankshaft rotates, the worm connected with the actuating motor, worm gear and sun gear do not rotate relative to the cylinder block; but the planetary gear rotates around the sun gear with the crankshaft rotation, at the same time, the planetary gear around also rotates around its own axis rotation, and the first transmission shaft that is connected to the planetary gear, the rear gear of the first transmission shaft, the front gear of the first eccentric sleeve and all the other transmission shafts, the front and rear gears of other transmission shafts, the front and rear gears of the other eccentric sleeve and the other eccentric sleeves rotate with the rotation of the planetary gear. That is: the rotation of the crankshaft itself will make rotation to the apparatus with the variable compression ratio and the variable expansion ratio except the worm gear and the sun gear.

According to the following drawings and embodiments elaborate upon the present invention, but the scope of protection of the present invention not limited to the following examples.

Example 1

The example shows an embodiment of the present invention that is used for the four cylinder inline engine. Referring to FIGS. 6, 7, and 8, apparatus 200 with the variable expansion ratio and the variable expansion ratio is installed on the engine's crankshaft 100 and the assembly 5 of the piston connecting rod.

The assembly 5 of the piston-connecting rod is the traditional structure, it comprises piston, piston pin, connecting rod cap, connecting rod body and the big hole of the connecting rod, the piston is movably mounted within the cylinder of the internal combustion engine, the bearing bush were mounted in the big hole of the connecting rod In order to set the eccentric sleeve on the crankpin, the crankshaft 100 adopts a split structure. The crankshaft 100 comprises the front main journal 10, the first main journal 11 and the plurality of other main journals one by one, the first crankpin 41 and the plurality of other crankpins of the following order and rear main journal; There is the first supporting cylindrical hole in the first main journal 11, there is an angle $\alpha \neq 0$ between the axis of the first supporting cylindrical hole and the crankshaft 100, The plurality of the main journals comprise the second main journal 12, the third main journal 13, and the fourth main journal 14, which is, respectively, provided the second supporting cylindrical hole, the third supporting cylindrical hole and the fourth supporting cylindrical hole. The axis of the second supporting cylindrical hole and the axis of the crankshaft 100 form an angle $\beta_2$, which is not zero. The axis of the third supporting cylindrical hole and the axis of the crankshaft are parallel but not coincide. The axis of the fourth supporting cylindrical hole and the axis of the crankshaft 100 form an angle $\beta_4$, which is not zero; The number of the plurality of the crankpin is 3, which include the second crankpin 42, the third crankpin 43 and the fourth crankpin 44; It is meant that this embodiment is used on a four cylinder internal combustion engine.

The apparatus 200 with variable compression ratio and variable expansion ratio comprises: the actuating motor 1, the worm 2, the worm gear 3, the sun gear 4, the first transmission shaft 21, the plurality of transmission shafts, the first eccentric sleeve 51, the plurality of eccentric shafts, the front gear 61 of the first eccentric sleeve, the plurality of front gears of eccentric shafts, the plurality of rear gears of eccentric shafts, the planetary gear 31, the rear gear 32 of the first transmission shaft, the plurality of front gears of transmission shafts and the plurality of rear gears of transmission shafts.

The actuating motor 1 is a servo motor with an angle encoder, fixed on the cylinder block of engine (not shown in figure).

The worm 2 is connected fixedly together with the actuating motor 1, and the axis of the worm 2 coincide with the axis of the actuating motor 1; and the rotation angle of the worm 2 is determined by the angle encoder of the actuating motor 1.

The worm gear 3 is engaged with the worm 2, and adopted a large reduction ratio, such as 50:1, also a reverse motion self-locking function.

The sun gear 4, which fixed coaxially on the worm gear 3, mounted rotatably on the front main journal 10 of the crankshaft 100.

The first transmission shaft 21 can be rotated to put into the first supporting cylindrical hole, and both ends of the transmission shaft extended out of the support cylindrical hole. The plurality of the transmission shafts, same quantity with the plurality of main journals, includes the second transmission shaft 22, the third transmission shaft 23 and the fourth transmission shaft 24, respectively, can be rotatably positioned one-to-one in the second, third and fourth supporting cylindrical holes, and both ends of the plurality of transmission shafts extended out of the support cylindrical holes;

As shown in FIG. 10, the first eccentric sleeve 51, which can be rotatably sleeved between the first crankpin 41 of the crankshaft 100 and corresponding the bearing bush of the big end of the connecting rod, comprises an inner cylindrical surface and the outer cylindrical surface, the center line of the inner cylindrical surface and the center line of the external cylindrical surface do not coincide and has an eccentricity e.

The plurality of the eccentric sleeves, same quantity with the plurality of the crankpins, which includes the second eccentric sleeve 52, the third eccentric sleeve 53 and the fourth eccentric sleeve 54, respectively, can be rotatably sleeved between the second crankpin 42, the third crankpin 43 and the fourth crankpin 44 and corresponding the bearing bushes of the big end of the connecting rods, and comprises an inner cylindrical surface and the outer cylindrical surface, the center line of the inner cylindrical surface and the center line of the external cylindrical surface do not coincide and has an eccentricity e as shown in FIG. 10.

The first eccentric sleeve 51, the second eccentric sleeve 52, the third eccentric sleeve 53 and the fourth eccentric sleeve 54 are whole eccentric sleeves. A bearing bush is installed inside the cylindrical surface of each eccentric sleeve.

The front gear 61 of the first eccentric sleeve, fixedly installed on front end of the first eccentric sleeve 51, the pitch circle center of the front gear 61 of the first eccentric sleeve and the center of the inner cylindrical surface of the eccentric sleeve 51 coincide.

The plurality of the front gears of the eccentric sleeves, which includes the front gear 63 of the second eccentric sleeve, the front gear 65 of the third eccentric sleeve and the front gear 67 of the fourth eccentric sleeve, respectively, fixedly installed on the front ends of the second eccentric sleeve 52, the third eccentric sleeve 53 and the fourth eccentric sleeve 54, the pitch circle centers of the plurality of the front gears of the eccentric sleeves, respectively, coincide with the corresponding centers of the inner cylindrical surfaces of the eccentric sleeves.

The plurality of the rear gears of the eccentric sleeves, which includes the rear gear 62 of the first eccentric sleeve, the rear gear 64 of the second eccentric sleeve and the rear gear 66 of the third eccentric sleeve, respectively, fixedly installed on the rear ends of the first eccentric sleeve 51, the second eccentric sleeve 52 and the third eccentric sleeve 53, the pitch circle centers of the plurality of the rear gears of the eccentric sleeves, respectively, coincide with the corresponding centers of the inner cylindrical surfaces of the eccentric sleeves.

The planetary gear 31, which is fixedly mounted on the front end of the first transmission shaft 21, engaged with the sun gear 4.

The rear gear 32 of the first transmission shaft, which is fixedly mounted on the rear end of the first transmission shaft 21, engaged with the front gear 61 of the first eccentric sleeve.

The plurality of the front gears of the transmission shafts, which include the front gear 33 of the second transmission shaft, the front gear 35 of the third transmission shaft and the front gear 37 of the fourth transmission shaft, is respectively fixed on the front end of the second transmission shaft 22, the third transmission shaft 23 and the fourth transmission shaft 24, and engaged with the rear gear 62 of the first eccentric sleeve, front adjacent to the eccentric sleeve, the rear gear 64 of the second eccentric sleeve and the rear gear 66 of the third eccentric sleeve.

The plurality of the rear gears of the transmission shafts, which include the rear gear 34 of the second transmission shaft, the rear gear 36 of the third transmission shaft and the rear gear 38 of the fourth transmission shaft, is respectively fixed on the rear end of the second transmission shaft 22, the third transmission shaft 23 and the fourth transmission shaft 24, and engaged with adjacent the front gear 63 of the second eccentric sleeve, the front gear 65 of the third eccentric sleeve and the front gear 67 of the fourth eccentric sleeve.

The teeth of all gears can be straight teeth, skew tooth or curved (helical) teeth.

The transmission ratio I is 1:2, that formed by the number $Z_4$ of teeth of the sun gear 4, the number $Z_{31}$ of teeth of the planetary gear 31, the number $Z_{32}$ of teeth of the rear gear 32 of the first transmission shaft, and the number $Z_{61}$ of teeth of the front gear 61 of the first eccentric sleeve, that is, The following illustrates the motion transfer process of changing the compression ratio and changing the expansion ratio of the example and embodiment 1:

As shown in FIG. 8, when the actuating motor 1 rotates, the worm 2, the worm gear 3 and the sun gear 4, which mounted rotatably on the front journal 10 of the crankshaft 100, are driven by the actuating motor 1, and rotate around axis 0-0 of the crankshaft 100, in the mean time, angle δ between the center line of the cylinder and the worm gear 3 changed; Further, the rotating motion is in turn transmitted to the planetary gear 31, the first transmission shaft 21, the rear gear 32 of the first transmission shaft, the front gear 61 of the first eccentric sleeve, the first eccentric sleeve 51, the rear gear 62 of the first eccentric sleeve, the front gear 33 of the second transmission shaft, the second transmission shaft 22, the rear gear 34 of the second transmission shaft, the front gear 63 the second eccentric sleeve, the second eccentric shaft 52, the rear gear 64 of the second eccentric shaft, the front gear 35 of the third transmission shaft, the third transmission shaft 23, the rear gear 36 of the transmission shaft, the front gear 65 of the third eccentric shaft, the third eccentric sleeve 53, the rear gear 66 of the third eccentric sleeve, the front gear 37 of the transmission shaft, the fourth transmission shaft 24, the rear gear 38 of the fourth transmission shaft, the front gear 67 of the fourth eccentric shaft and the fourth eccentric sleeve; Thus, the first eccentric sleeve 51 around the first crankpin 41, the second eccentric sleeve 52 around the second crankpin 42, the third eccentric sleeve 53 around the third crankpin 43 and the fourth eccentric sleeve 54 around the fourth crankpin 44 rotate in the same time and synchronization.

When the actuating motor 1 does not rotate, the worm 2, worm gear 3 and sun gear 4 also does not rotate, but when the crankshaft 100 rotates, the planetary gear 31, which mounted on the crankshaft 100, will rotate around the axis 0-0 of the crankshaft with the rotation of the crankshaft 100, due to the sun gear 4 and planetary gear 31 mesh with each other (the sun gear 4 is fixed, do not move at the moment) and will therefore not only lead planetary gear 31 around the sun gear 4 to revolution, at the same time, but also lead to rotation around its own axis 210, the rotation further rotational movement and synchronous transfer to each of the eccentric sleeves.

Proper selection of the angle α between the axis 0-0 of the crankshaft 100 and the axis 210 of the first transmission shaft 21 that inserts in the first main journal, of the angle $β_2$ between the axis 0-0 of the crankshaft 100 and the axis 220 of the second transmission shaft 22 that inserts in the second main journal 12, of the angle between the axis 0-0 of the crankshaft 100 and the axis 230 of the third transmission shaft 23 that inserts in the third main journal 13, and of the angle $β_4$ between the axis 0-0 of the crankshaft 100 and the axis 240 of the fourth transmission shaft 24 that inserts in the fourth main journal 14, the sun gear 4 and the planetary gear 31, the rear gear 32 of the first transmission shaft and the front gear 61 of the first eccentric sleeve, the rear gear 62 of the first eccentric sleeve and the front gear 33 of the second transmission shaft, the rear gear 34 of the second transmission shaft and the front gear 63 of the second eccentric shaft, the rear gear 64 of the second eccentric sleeve and the front gear 35 of the third transmission shaft, the rear gear 36 of the third transmission shaft and the front gear 65 of the third eccentric shaft, the rear gear 66 of the third eccentric sleeve and the front gear 37 of the fourth transmission shaft, the rear gear 38 of the fourth transmission shaft and the front gear 67 of the fourth eccentric sleeve, which all can maintain precision of gear meshing.

According to the figures the change principle of the compression ratio and expansion ratio will be explained as follows: in order to change the compression ratio and expansion ratio, the rotating angle θ of the first eccentric sleeve 51 relative to the first crankpin 41 and initial eccentric angle $θ_0$ must be changed (only the state of the first cylinder is described, and the other cylinder is the same).

Figures 1, 1A, 1B:
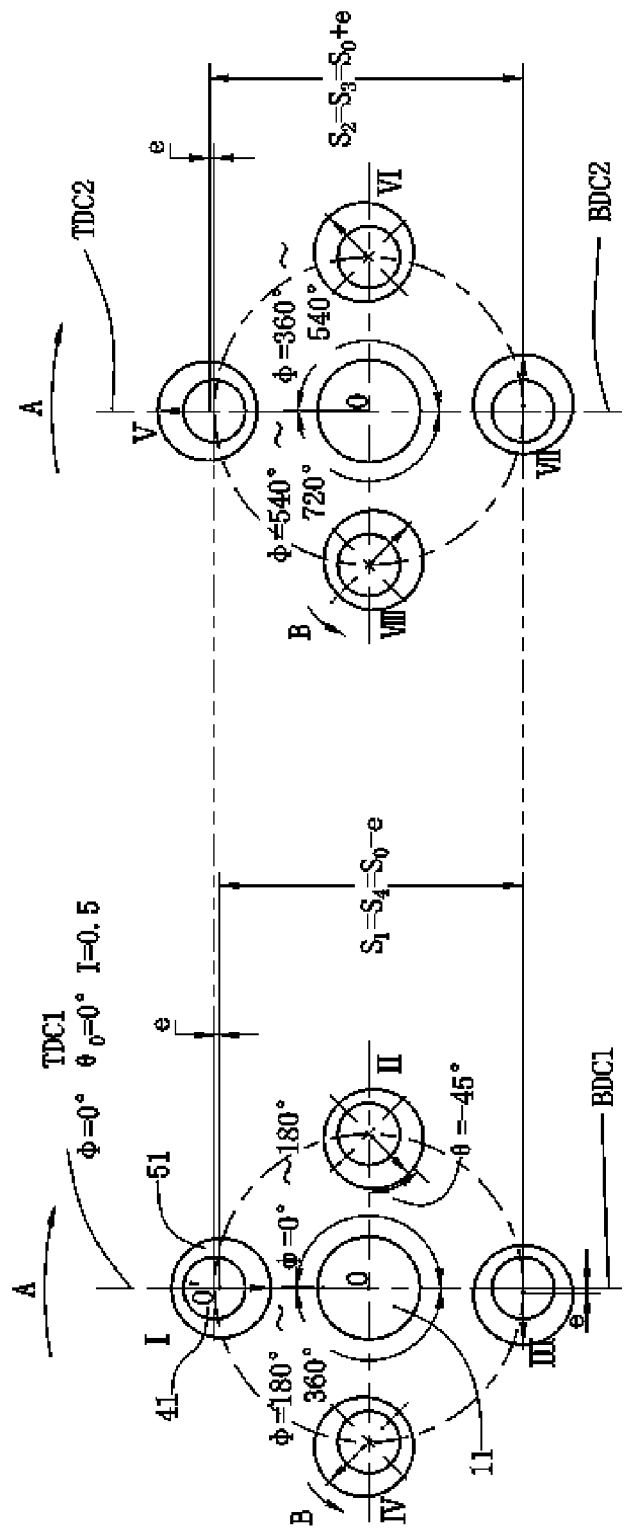
FIG. 1 shows the stroke variation of the internal combustion engine when the engine is running in low load condition, with FIG. 1a showing the positions I, II, III, and IV.
FIG. 1b showing the positions V, VI, VII, and VIII. The reference numbers and characters used refer to: I: the transmission ratio; S0: the original stroke length without the eccentric sleeve and the number is equal to two times the length of the crank arm; $S_1$: the suction stroke; $S_2$: the compression stroke; $S_3$: the expansion stroke; $S_4$: the exhaust stroke; e: the eccentricity of the eccentric sleeve; TDC1: top dead center of the first cylinder-piston at the beginning of suction; TDC2: top dead center of the first cylinder-piston at the beginning of expansion; BDC1: bottom dead center of the first cylinder-piston at the beginning of compression; BDC2: bottom dead center of the first cylinder-piston at the beginning of exhaust gas; A: rotating direction of the crankshaft of the internal combustion engine; B: rotating direction of the first eccentric sleeve relative to the first crankpin; Φ: crankshaft angle, starting calculation from the first cylinder-piston TDC1; δ: angle between the center line of the cylinder and the worm gear; $θ_0$: initial eccentric angle of the first eccentric sleeve, $θ_0=0.5δ$; θ: rotating angle of the first eccentric sleeve relative to the first crankpin, $θ=θ_0-0.5Φ$.

About the rotating angle θ of the first eccentric sleeve 51 relative to the first crankpin 41: as shown in FIG. 1a, the rotating angle θ of the first eccentric sleeve 51 is defined as: the angle between the connection line from the center O of the first crankshaft main journal 11 to the center O' of the first crankpin 41 and eccentric direction of the first eccentric sleeve 51 (the arrow pointing direction in figure). When the first crankpin 41 locates in position II of 90 degree crank angle, the rotating angle θ of the first eccentric sleeve 51 is −45 degrees.

The rotating angle θ of the first eccentric sleeve 51 is a function of the angle Φ of the crankshaft 100, namely: θ=f (Φ), see FIG. 8, When the transmission ratio I, which is formed by the number $Z_4$ of teeth of the sun gear 4, the number $Z_{31}$ of teeth of the planetary gear 31, the number $Z_{32}$ of teeth of the rear gear 32 of the first transmission shaft, and the number $Z_{61}$ of teeth of the front gear 61 of the first eccentric sleeve, equals 1:2, that is, $I=(Z_4/Z_{31})*(Z_{32}/Z_{61})$ =0.5, the formula of the relation between the rotating angle θ of the first eccentric sleeve 51 and the angle Φ of the crankshaft 100 is: $θ=θ_0−0.5Φ$, that is to say, when $θ_0=0$, the crankshaft 100 rotates 360 degree around axis 0-0, the first eccentric sleeve 51 rotates −180 degree around axis O'-O' of the first crankpin, where the "-" indicates the reverse direction of the crankshaft 100 rotation.

As shown in FIG. 5, when above-mentioned ratio of the teeth number: $I=(Z_4/Z_{31})*(Z_{32}/Z_{61})=1$, the formula of the relation between the angle θ of the first eccentric sleeve 51 and the angle Φ of the crankshaft 100 is: $θ=θ_0−0.5Φ$. When $θ_0=0$, and the crankshaft 100 rotates 360 degree around axis 0-0, the first eccentric sleeve 51 rotates −360 degree around axis O'-O' of the first crankpin.

About initial eccentric angle $θ_0$ of the first eccentric sleeve 51: as shown in FIG. 2a, the initial eccentric angle $θ_0$ of the first eccentric sleeve 51 is defined as: the angle between the connection line from the center O of the first crankshaft main journal 11 to the center O' of the first crankpin 41 and eccentric direction of the first eccentric sleeve 51, in this moment, the first crankpin 41 locates in position I, the piston reached the point of TDC1, which express the piston of the first cylinder starting suction. FIG. 2a shows, the initial eccentric angle $θ_0$ of the first eccentric sleeve 51 is 45 degrees, $θ_0=45°$.

The initial eccentric angle $θ_0$ of the first eccentric sleeve 51 is a function of the angle δ of the worm gear 3 and the sun gear 4, that is: $θ_0=f(δ)$, as shown in FIG. 9, the angle δ is the angle of the worm gear 3 and the sun gear 4 relative to the center line of the cylinder.

When the transmission ratio I, which is formed by the number $Z_4$ of teeth of the sun gear 4, the number $Z_{31}$ of teeth of the planetary gear 31, the number $Z_{32}$ of teeth of the rear gear 32 of the first transmission shaft, and the number $Z_{61}$ of teeth of the front gear 61 of the first eccentric sleeve, equals 1:2, that is, $I=(Z_4/Z_{31})*(Z_{32}/Z_{61})=0.5$, the formula of the relation between the initial eccentric angle $θ_0$ of the first eccentric sleeve 51 and the angle δ of the worm gear 3 is: $θ_0=0.5δ$, that is to say, when the worn gear 3 and the sun gear 4 rotates 360 degree around axis 0-0 of the crankshaft 100, the first eccentric sleeve 51 rotates 180 degree around axis O'-O' of the first crankpin; When the above mentioned transmission ratio $I=(Z_4/Z_{31})(Z_{32}/Z_{61})=1$, the formula of the relation between the initial eccentric angle $θ_0$ of the first eccentric sleeve 51 and the angle δ of the worm gear 3 is: $θ_0=δ$. That is to say, when the worn gear 3 and the sun gear 4 rotates 360 degree around axis 0-0 of the crankshaft 100, the first eccentric sleeve 51 rotates also 360 degree around axis O'-O' of the first crankpin; See FIG. 5a, the initial eccentric angle of the first eccentric sleeve 51 is 180 degree, $θ_0=180°$.

When the initial eccentric angle $θ_0$ of the first eccentric sleeve 51 does not change, the actuating motor 1 fixed on the cylinder block (not shown in the figure) does not rotate, and all of the worm 2, the worm gear 3 and the sun gear 4 connected with the actuating motor do not rotate also relative to the cylinder block. When the crankshaft 100 rotates around its axis 0-0, the planetary gear 31, which mounted on the crankshaft 100, will rotate around the axis 0-0 of the crankshaft, due to the sun gear 4 and planetary gear 31 mesh with each other, this will not only lead planetary gear 31 around the axis 0-0 of the crankshaft in revolution, at the same time, but also lead to rotate around its own axis 210, the rotation further makes the front gear 61 of first eccentric sleeve, the first eccentric sleeve 51 and the rear gear 62 of the eccentric sleeve in rotation around the axis O'-O' of the first crankpin.

Due to the first eccentric sleeve 51 is mounted between the bearing bush of the big end of the piston-connecting rod assembly 5 and the first crankpin 41, and there is a eccentricity e in the first eccentric sleeve 51, (see the FIG. 10), the eccentricity e rotates around the first crankpin 41, this will change directly the length of the crank arm, thereby, will change the stroke length of suction, compression, expansion and exhaust. That is: The change of the angle Φ of the crankshaft 100 will lead to the change of the angle θ of the first eccentric sleeve 51, further the change of the stroke length.

The variances in the angle δ of the worm gear 3 changes the initial eccentric angle $θ_0$ of the first eccentric sleeve 51, and also changed the intake, compression, expansion and exhaust stroke length of the internal combustion engine.

The rotation angle Φ of the crankshaft 100 and the angle δ of the worm gear changes, lead the rotation angle θ of the first eccentric sleeve 51 and the initial eccentric angle $θ_0$ to change, both of Φ and δ cooperate closely, make the internal combustion engine whether it is in low load condition and high load conditions to obtain the satisfactory result to improve efficiency.

Several typical operating conditions of the internal combustion engine are described below:

A) The transmission ratio 1=0.5, The initial eccentric angle $θ_0=0°$, At this time, the compression ratio and expansion ratio reached the highest value at the end of compression in the first cylinder, as shown in FIGS. 1a and 1b. This situation is particularly suitable for low load operating for four strokes internal combustion engine, In one thermodynamic cycle of the crankshaft rotating 720 degrees of the internal combustion engine, suction, compression, expansion and exhaust stroke behavior as follows:

| Crankshaft angle | stroke | Length of stroke | path | result |
|---|---|---|---|---|
| 0°~180° | Suction $S_1$ | $S_0−e$ | I-II-III | Suction reduction |
| 180°~360° | Compression $S_2$ | $S_0+e$ | III-IV-V | Compression increase |
| 360°~540° | Expansion $S_3$ | $S_0+e$ | V-VI-VII | Expansion stroke extension |
| 540°~720° | Exhaust $S_4$ | $S_0−e$ | VII-VIII-I | EGR in cylinder increase |

See above table, in the intake stroke, due to suction reduced, greatly reduced pumping losses; In the compression stroke, due to the compression ratio increases, greatly improve ignition condition of the internal combustion engine, combustion efficiency and emission level; In the expansion stroke, due to the expansion stroke extension, more power and torque output at the same time and reduce fuel consumption; In the exhaust stroke, due to the reduction of exhaust, increased the EGR in cylinder, which will create the conditions to reduce pumping losses for the suction of the next circulation, and at the same time, raised the temperature in cylinder, improved the ignition conditions, and improved combustion efficiency. In short, the above mentioned change make the low load condition of the internal combustion engine much better than the low load condition of the existing internal combustion engine.

B) The transmission ratio 1=0.5, The initial eccentric angle $\theta_0=45°$, At this time, the compression ratio reached the normal value at the end of compression in the first cylinder, but the expansion ratio is very high, as shown in FIGS. 2a and 2b. This situation is particularly suitable for low load and middle load operating for four strokes internal combustion engine, In one thermodynamic cycle of the crankshaft rotating 720 degrees of the internal combustion engine, suction, compression, expansion and exhaust stroke behavior as follows:

| Crankshaft angle | stroke | Length of stroke | path | result |
|---|---|---|---|---|
| 0°~180° | Suction $S_1$ | $S_0-1.414e$ | I-II-III | Suction reduction more |
| 180°~360° | Compression $S_2$ | $S_0$ | III-IV-V | Compression not changed |
| 360°~540° | Expansion $S_3$ | $S_0+1.414e$ | V-VI-VII | Expansion increase more |
| 540°~720° | Exhaust $S_4$ | $S_0$ | VII-VIII-I | Exhaust not changed |

C) The transmission ratio 1=0.5, The initial eccentric angle $\theta_0=90°$, At this time, the compression ratio reached the lower value than normal at the end of compression in the first cylinder, the expansion ratio is higher value than normal, as shown in FIGS. 3a and 3b. This situation is particularly suitable for high load and middle load operating for four strokes internal combustion engine, In one thermodynamic cycle of the crankshaft rotating 720 degrees of the internal combustion engine, suction, compression, expansion and exhaust stroke behavior as follows:

| Crankshaft angle | stroke | Length of stroke | path | result |
|---|---|---|---|---|
| 0°~180° | Suction $S_1$ | $S_0-e$ | I-II-III | Suction reduction |
| 180°~360° | Compression $S_2$ | $S_0-e$ | III-IV-V | Compression reduction |
| 360°~540° | Expansion $S_3$ | $S_0+e$ | V-VI-VII | Expansion increase |
| 540°~720° | Exhaust $S_4$ | $S_0+e$ | VII-VIII-I | Exhaust increase |

D) The transmission ratio 1=0.5, The initial eccentric angle $\theta_0=180°$, At this time, the compression ratio reached the lowest value at the end of compression in the first cylinder, the expansion ratio is lowest value, as shown in FIGS. 4a and 4b. This situation is particularly suitable for full load operating for four strokes internal combustion engine, In one thermodynamic cycle of the crankshaft rotating 720 degrees of the internal combustion engine, suction, compression, expansion and exhaust stroke behavior as follows:

| Crankshaft angle | stroke | Length of stroke | path | result |
|---|---|---|---|---|
| 0°~180° | Suction $S_1$ | $S_0-e$ | I-II-III | Suction increase |
| 180°~360° | Compression $S_2$ | $S_0-e$ | III-IV-V | Compression reduction |
| 360°~540° | Expansion $S_3$ | $S_0+e$ | V-VI-VII | Expansion reduction |
| 540°~720° | Exhaust $S_4$ | $S_0+e$ | VII-VIII-I | Exhaust increase |

When the internal combustion engine is in high load or full load condition, the prominent contradiction is to prevent the occurrence of internal combustion engine knock. At the same time, and at this condition, it is particularly expected the internal combustion engine to increase output of large power and torque, due to compression ratio decreased for the internal combustion engine, it is possible to adopt a large charge ratio. Therefore, in FIG. 3 and FIG. 4, compression ratio reduction is key to improve the internal combustion engine power and torque output.

FIGS. 1, 2, 3, and 4, respectively, represent a few typical conditions, in fact, the internal combustion engine is based on the MAP table, the operating conditions are continuous adjustable.

E) The transmission ratio I=1, The initial eccentric angle $\theta_0=180°$, At this time, the compression ratio reached the highest value at the end of compression in the first cylinder, the expansion ratio is also highest value, as shown in FIG. 5a. This situation is particularly suitable for low load operating for two strokes internal combustion engine (Of course, it can also be used in the four stroke engine). In one thermodynamic cycle of the crankshaft rotating 720 degrees of the internal combustion engine, all of the suction, compression, expansion and exhaust stroke do not change:

| Crankshaft angle | stroke | Length of stroke | path | result |
|---|---|---|---|---|
| 0°~180° | Suction $S_1$ | $S_0$ | I-II-III | |
| 180°~360° | Compression $S_2$ | $S_0$ | III-IV-V | |
| 360°~540° | Expansion $S_3$ | $S_0$ | V-VI-VII | |
| 540°~720° | Exhaust $S_4$ | $S_0$ | VII-VIII-I | |

F) The transmission ratio I=1, The initial eccentric angle $\theta_0=0°$, At this time, the compression ratio reached the lowest value at the end of compression in the first cylinder, the expansion ratio is also lowest value, as shown in FIG. 5b. This situation is particularly suitable for high load operating for two strokes internal combustion engine (Of course, it can also be used in the four stroke engine). In one thermodynamic cycle of the crankshaft rotating 720 degrees of the internal combustion engine, all of the suction, compression, expansion and exhaust stroke do not change:

| Crankshaft angle | stroke | Length of stroke | path | result |
|---|---|---|---|---|
| 0°~180° | Suction $S_1$ | $S_0$ | I-II-III | |
| 180°~360° | Compression $S_2$ | $S_0$ | III-IV-V | |
| 360°~540° | Expansion $S_3$ | $S_0$ | V-VI-VII | |
| 540°~720° | Exhaust $S_4$ | $S_0$ | VII-VIII-I | |

Through analysis for above mentioned several operating modes of the A, B, C, D, E, and F, after decision of the transmission ratio I, the needed operating condition of internal combustion engine is obtained by only change of the initial eccentric angle $\theta_0$.

So, to change the initial eccentric angle θ of the first eccentric sleeve 51 relative to the first crankpin 41, as shown in FIG. 8 and FIG. 9, first of all, engine ECU collects the phase signal of the actuating motor 1 from the encoder carried by the actuating motor itself, due to the signal is a type of absolute signal, thus, the signal corresponds to a unique rotating position in the full adjustment range of the actuating motor 1. Through calculation according to the transmission ratio of the worm 2 and worm gear 3, the angle δ of the worm gear 3 relative to the center line of the cylinder block will be obtained, the initial eccentric angle $\theta_0$ of the first cylinder-piston up to the TDC and the initial eccentric angle $\theta_0$ of the other cylinder will also be obtained. Further engine ECU through comparing with the intention of the driver's operation, sets a new target initial eccentric angle $\theta_1$, and calculates out of a new target value $\delta_1$, the new target $\delta_1$ corresponds a new angle of the encoder of the actuating motor, and finally the actuating motor 1 adjusts accordingly. The new initial eccentric angle $\theta_1$ of the first cylinder of engine has a unique corresponding relationship with the new engine compression ratio and expansion ratio.

In order to make the first eccentric sleeve 51 to reach new initial eccentric angle $\theta_1$, the actuating motor 1 according to the new angle of encoder to rotate, which in turn drives the worm 2, the worm gear 3, the sun gear 4, the planetary gear 31, the first transmission shaft 21, the rear gear 32 of the first transmission shaft, the front gear 61 of the first eccentric sleeve and the first eccentric sleeve to rotate, until the first eccentric sleeve 51 rotates to a new target value of the initial eccentric angle $\theta_1$. At the same time, the second eccentric sleeve 52, the third eccentric sleeve 53, and the fourth eccentric sleeve also simultaneously reached their respective new target value, completes the compression ratio and expansion ratio adjustment for all cylinders.

Example 2

This example and embodiment is used for the four cylinder inline engine. As shown in FIGS. 11 and 12, the embodiment 2 has the same structure, transmission principle, function and role as Example 1 and embodiment 1 except for the following:
A) The axis 210 of the first transmission shaft, the axis 220 of the second transmission shaft, the axis 230 of the transmission shaft and axis 240 of the transmission shaft are all parallel with the axis 0-0 of the crankshaft 100, but do not coincide, that is: $\alpha=\beta_4=\beta_2=0$.
B) The transmission ratio I is 1:1, that is: $I=(Z_4/Z_{31})*(Z_{32}/Z_{61})=1$. In addition, in order to facilitate the transmission shafts through the main journals, make it from the front end of the main journals to reach the back end of the main journals, the diameters of the main journals are increased correspondingly.

Example 3

This example and embodiment is used for the four cylinder inline engine. As shown in FIG. 13, the embodiment 3 has the same structure, transmission principle, function and role as Example 1 and embodiment 1 except for the following:
A) The axis 220 of the second transmission shaft, the axis 230 of the transmission shaft and axis 240 of the transmission shaft coincide with the axis 0-0 of the crankshaft 100.

Example 4

This example and embodiment 4 is used for the four cylinder inline engine. The structure, transmission principle, function and action of the embodiment 4 are nearly the same as the embodiment 3, the only difference are that the axis 220 of the second transmission shaft, the axis 230 of the transmission shaft, and axis 240 of the transmission shaft are parallel but all do not coincide in this embodiment.

Example 5

This example and embodiment 5 is used for the three cylinder inline engine. As shown in FIGS. 14, 15, and 16, the structure, transmission principle, function and action of the embodiment 5 are nearly the same as the embodiment 1, the only difference are that the number of the plurality of crankpin is 2, the axis 220 of the second transmission shaft, and the axis 230 of the transmission are parallel but do not coincide with the axis 0-0 of the crankshaft 100.

Example 6

This example and embodiment is used for the six cylinder V type engine. The embodiment 6 has nearly the same structure, transmission principle, function and role as the embodiment 5 except for the following:
A) As shown in FIG. 15, the first crankpin 41, the second crankpin 42, and the third crankpin 43 along the axis 0-0 direction of the crankshaft 100 are extended a length of the connecting rod width, in order to make each crankpin to be provided with two connecting rods. One connecting rod is used in the left cylinder, and another in the right cylinder of the V engine.
B) As shown in FIG. 15, there is the plurality of the another eccentric sleeves, which fixedly respectively mounted on the rear or front of the first eccentric sleeve 51, the second eccentric sleeve 52, and the third eccentric sleeve 53, the direction of the plurality of the eccentric sleeve forms an angle with the direction of the original eccentric sleeve. The value of which is equal to the angle between the two cylinder center line of the V6 type inner combustion engine. So that when the left side piston reach at TDC, and the right side also reach the TDC.

Example 7

This example and embodiment 7 is used for the 8 cylinder V type engine. As shown in FIG. 8, based on the embodiments 1, 2, 3, and 4, the first crankpin 41 and the first eccentric sleeve 51, the second crankpin 42 and the second eccentric sleeve 52, the third crankpin 43 and the third eccentric sleeve, and the fourth crankpin 44 and the fourth eccentric sleeve 54 along the axis 0-0 direction of the crankshaft 100 are extended a length of the connecting rod width, in order to make each crankpin to be provided with two connecting rods. This example and embodiment is the same as embodiment 6 to form a type of V8 structure, the direction of the added eccentric sleeve forms an angle with the direction of the original eccentric sleeve. The dimension of the angle is equal to the angle between the two cylinder center line of the V8 type inner combustion engine.

Example 8

This example and embodiment 8 is used for the two cylinder inline engine. Based on the embodiments 1, 2, 3, and 4, the third crankpin 43, the fourth crankpin 44, the fourth main journal 14, the fifth main journal and its back part will be cut off. It will hold the first main journal 11, the second main journal 12, the third main journal 13, the first crankpin 41 and the second crankpin 42, forming two cylinder inline engine.

Example 9

This example and embodiment 9 is used for the 4 cylinder V type engine. Based on the embodiment 8, the first crankpin 41, the second crankpin along the axis 0-0 direction of the crankshaft 100 are extended a length of the connecting rod width, in order to make each crankpin to be provided with two connecting rods. This embodiment 9 is the same with embodiment 6 to form a type of V4 structure, the direction of the added eccentric sleeve forms an angle with the direction of the original eccentric sleeve. The dimension of the angle is equal to the angle between the two cylinder center line of the V4 type inner combustion engine.

Example 10

This example and embodiment 10 is used for the single cylinder engine. Based on the embodiment 8, the second crankpin 42 and the third main journal 13 are further cut off. It holds only the first main journal 11, the second main journal 12, and the first crankpin 41, forming a single cylinder engine.

Example 11

This embodiment is used for the 2 cylinder V type engine. Based on embodiment 10, the first crankpin 41 along the axis 0-0 direction of the crankshaft 100 is extended a length of the connecting rod width, in order to the crankpin is provided with two connecting rods. This embodiment is the same with embodiment 6 to form a type of V2 structure, the direction of the added eccentric sleeve forms an angle with the direction of the original eccentric sleeve. The dimension of the angle is equal to the angle between the two cylinder center line of the V2 type inner combustion engine.

The present invention may be used in more types internal combustion engines, for examples, such as W, planetary structure of internal combustion engine. Based on the knowledge of the existing technology and the description of the present invention, technicians in the field may completely realize and apply the present invention in various types of inline, V type, W type, star layout and opposed layout, and single cylinder and multi cylinder internal combustion engines.

In the apparatus of the present invention, the driving system successively drives the eccentric sleeves on the crankpins to rotate an angle variant through the transmission system, realizes the change of the stroke length of the engine, thus changes the ratio of the compression and expansion of the engine, and the changes make all strokes of suction, compression, expansion and exhaust to improve the efficiency in a thermodynamic cycle whenever the internal combustion engine work in full load or part load.

I claim:

1. An apparatus with variable compression ratio and variable expansion ratio for an internal combustion engine, mounted on an engine crankshaft having a first main journal and a plurality of other orderly placed main journals and a first crankpin and a plurality of other orderly placed crankpins and an assembly of a piston-connecting rod having a bearing bush on a big end of the piston-connecting rod, comprising a first supporting cylindrical hole in a first main journal, having an angle between an axis of the first supporting cylindrical hole and the crankshaft, each of the plurality of the other orderly placed main journals is provided respectively with a supporting cylindrical hole, an axis of each supporting cylindrical hole is either coaxial with or parallel to without overlapping an axis of the crankshaft or forms a non-zero angle between the axis of each supporting cylindrical hole and the axis of the crankshaft, an actuating motor fixed on a cylinder block of an engine, a worm connected fixedly coaxially together with the actuating motor, a worm gear meshed with the worm, a sun gear fixed coaxially on the worm gear and mounted pivotally on a crankshaft, a first transmission shaft being rotatably put into the first supporting cylindrical hole, and both ends of the first transmission shaft extending out of the first support cylindrical hole, a plurality of transmission shafts, each corresponding to each of the plurality of the other orderly placed main journals, respectively being rotatably positioned one-to-one in the supporting cylindrical holes, and both ends of each of the plurality of transmission shafts extending out of the support cylindrical holes, a first eccentric sleeve being rotatably sleeved between a first crankpin of the crankshaft and the corresponding bearing bush of the big end of the piston-connecting rod, having an inner cylindrical surface and an outer cylindrical surface, and a center line of the inner cylindrical surface and a center line of the external cylindrical surface not coinciding but having an eccentricity e, a plurality of eccentric sleeves, each corresponding to each of the plurality of the crankpins, respectively rotatably sleeved between the plurality of crankpins and the corresponding bearing bushes of the big end of the piston-connecting rods, having an inner cylindrical surface and an outer cylindrical surface, a center line of the inner cylindrical surface and a center line of the external cylindrical surface not coinciding but having an eccentricity e, a front gear of the first eccentric sleeve fixed on a front end of the first eccentric sleeve and having a pitch circle center that coincides with the center of the inner cylindrical surface of the first eccentric sleeve, a plurality of front gears of the eccentric sleeves, respectively fixed on front ends of the corresponding eccentric sleeves and each having a pitch circle center that coincides with the center of the inner cylindrical surface of the corresponding eccentric sleeve, a plurality of rear gears of the eccentric sleeves, respectively fixed on a rear end of each of the corresponding eccentric sleeves and each having a pitch circle center that coincides with the center of the inner cylindrical surface of the corresponding eccentric sleeve, a planetary gear fixedly mounted on the front end of the first transmission shaft and engaged with the sun gear, a rear gear of the first transmission shaft fixedly mounted on the rear end of the first transmission shaft and engaged with the front gear of the first eccentric sleeve, a plurality of the front gear of the transmission shafts respectively fixed on the front end of each of the corresponding transmission shafts and engaged with the adjacent rear gear of the eccentric sleeves, and a plurality of the rear gear of the transmission shafts respectively fixed on the rear end of each of the corresponding transmission shafts and engaged with the adjacent front gear of the eccentric sleeves.

2. The apparatus with variable compression ratio and variable expansion ratio according to claim 1, wherein the angle between the axes of the first supporting cylindrical hole and the crankshaft is not zero.

3. The apparatus with variable compression ratio and variable expansion ratio according to claim 1, wherein the angle between the axes of the first supporting cylindrical hole and the crankshaft is zero, and the axis of the first supporting cylindrical hole and the axis of the crankshaft is parallel and do not coincide.

4. The apparatus with variable compression ratio and variable expansion ratio according to claim 1, wherein a transmission ratio I as defined by a number of teeth of the sun gear $Z_4$, a number of teeth of the planetary gear $Z_{31}$, a number of teeth of the rear gear of the first transmission shaft $Z_{32}$, and a number of teeth of the front gear of the first eccentric sleeve $Z_{61}$ as $I=(Z_4/Z_{31})*(Z_{32}/Z_{61})$ is 1:2.

5. The apparatus with variable compression ratio and variable expansion ratio according to claim 1, wherein a transmission ratio I defined by a number of teeth of the sun gear $Z_4$, a number of teeth of the planetary gear $Z_{31}$, a number of teeth of the rear gear of the first transmission shaft $Z_{32}$, and a number of teeth of the front gear of the first eccentric sleeve $Z_{61}$ as $I=(Z_4/Z_{31})*(Z_{32}/Z_{61})$ is 1:1.

6. The apparatus with variable compression ratio and variable expansion ratio according to claim 1, wherein the actuating motor is a servo motor with an angle encoder, and the rotation angle of the worm is determined by the angle encoder of the motor.

7. The apparatus with variable compression ratio and variable expansion ratio according to claim 1, wherein the number of a plurality of the crankpins is 0, 1, 2, 3, 4, or 5.

8. The apparatus with variable compression ratio and variable expansion ratio according to claim 1, wherein the main journals comprise a second main journal, a third main journal, and a fourth main journal, that is respectively provided with a second supporting cylindrical hole, a third supporting cylindrical hole, and a fourth supporting cylindrical hole;
the axis of the second supporting cylindrical hole and the axis of the crankshaft form an angle β2 that is not zero;
the axis of the third supporting cylindrical hole and the axis of the crankshaft form an angle that is zero;
the axis of the fourth supporting cylindrical hole and the axis of the crankshaft form an angle β4 that is not zero;
the transmission shafts comprise a second transmission shaft, a third transmission shaft, and a fourth transmission shaft, respectively being rotatably placed in the second supporting cylindrical hole, the third supporting cylindrical hole, and the fourth supporting cylindrical hole;
the crankpins comprise the second crankpin, the third crankpin, and the fourth crankpin;
the eccentric sleeves comprise the second eccentric sleeve, the third eccentric sleeve and the fourth eccentric sleeve, respectively being rotatably sleeved between the second crankpin, the third crankpin, and the fourth crankpin and the corresponding bearing bush of the big end of the piston-connecting rod;
the front gear of the eccentric sleeves comprises the second front gear of the eccentric sleeve, the third front gear of the eccentric sleeve, and the fourth front gear of the eccentric sleeve, respectively being fixed on the front of the second eccentric sleeve, the third eccentric sleeve, and the fourth eccentric sleeve;
the rear gear of the eccentric sleeves comprises the first rear gear of the eccentric sleeve, the second rear gear of the eccentric sleeve, and the third rear gear of the eccentric sleeve, respectively being fixed on the rear of the first eccentric sleeve, the second eccentric sleeve, and the third eccentric sleeve;
the front gears of the transmission shafts comprises the front gear of the second transmission shaft, the front gear of the third transmission shaft, and the front gear of the fourth transmission shaft, respectively being fixed on the front end of the second transmission shaft, the third transmission shaft, and the fourth transmission shaft, and the front gears of the transmission shafts respectively being meshed with the front adjacent eccentric sleeve's rear gears of the first eccentric sleeve, the second eccentric sleeve, and the third eccentric sleeve; and
the rear gears of the transmission shafts comprise the rear gear of the second transmission shaft, the rear gear of the third transmission shaft and the rear gear of the fourth transmission shaft, which are respectively fixed on the rear end of the second transmission shaft, the third transmission shaft and the fourth transmission shaft, and the rear gears of the transmission shafts respectively being meshed with the rear adjacent eccentric sleeve's front gears of the second eccentric sleeve, the third eccentric sleeve and fourth eccentric sleeve.

9. The apparatus with variable compression ratio and variable expansion ratio according to claim 1, wherein the apparatus with variable compression ratio and variable expansion ratio is used in a single cylinder or multi cylinder internal combustion inline engine, V type, W type, star or opposed layout multi cylinder internal combustion inline engine.

* * * * *